United States Patent
Lin

(10) Patent No.: US 9,999,028 B2
(45) Date of Patent: Jun. 12, 2018

(54) DATA TRANSMISSION METHOD, BASE STATION, AND USER EQUIPMENT

(71) Applicant: HUAWEI TECHNOLOGIES CO., LTD., Shenzhen (CN)

(72) Inventor: Bo Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 356 days.

(21) Appl. No.: 14/801,969

(22) Filed: Jul. 17, 2015

(65) Prior Publication Data

US 2015/0327236 A1 Nov. 12, 2015

Related U.S. Application Data

(63) Continuation of application No. PCT/CN2013/070719, filed on Jan. 18, 2013.

(51) Int. Cl.
  *H04W 4/00* (2018.01)
  *H04W 72/04* (2009.01)
  (Continued)

(52) U.S. Cl.
  CPC ......... *H04W 72/0406* (2013.01); *H04L 47/34* (2013.01); *H04L 69/22* (2013.01); *H04W 76/022* (2013.01)

(58) Field of Classification Search
  CPC .............. H04W 72/0406; H04W 76/022; H04L 47/34; H04L 69/22
  (Continued)

(56) References Cited

U.S. PATENT DOCUMENTS

| 7,352,727 B2 | 4/2008 | Beckmann et al. |
| 2010/0260096 A1 | 10/2010 | Ulupinar et al. |

(Continued)

FOREIGN PATENT DOCUMENTS

| CN | 102695213 A | 9/2012 |
| CN | 102761904 A | 10/2012 |

(Continued)

OTHER PUBLICATIONS

Extended European Search Report dated Feb. 29, 2016 in related European Patent Application No. 13871512.3 (8 pages).

(Continued)

*Primary Examiner* — Iqbal Zaidi
(74) *Attorney, Agent, or Firm* — Staas & Halsey LLP

(57) ABSTRACT

A first base station establishes a first PDCP entity. The first base station sends first configuration information to a second communications node, and sends second configuration information to user equipment. The first base station sends fourth configuration information to the second communications node for establishing a third bearer between the first base station and the second communications node. The first base station uses the third bearer and the second radio bearer to transmit at least a part of data of the service data between the first base station and the user equipment, where in a process in which the first base station transmits the service data, the first PDCP entity of the first base station and a second PDCP entity of the second communications node perform joint processing on the at least a part of data.

20 Claims, 15 Drawing Sheets

(51) Int. Cl.
  *H04L 29/06* (2006.01)
  *H04L 12/801* (2013.01)
  *H04W 76/02* (2009.01)
(58) Field of Classification Search
  USPC .................................................. 370/230–339
  See application file for complete search history.

(56) References Cited

U.S. PATENT DOCUMENTS

| | | | | |
|---|---|---|---|---|
| 2012/0028631 | A1* | 2/2012 | Chun | H04L 1/1614 455/422.1 |
| 2015/0117286 | A1* | 4/2015 | Kim | H04W 52/0216 370/311 |

FOREIGN PATENT DOCUMENTS

| | | |
|---|---|---|
| EP | 2426994 A1 | 4/2010 |
| WO | WO 2011/097523 A1 | 8/2011 |
| WO | WO 2014/110810 | 7/2014 |

OTHER PUBLICATIONS

"*Joint PDCP protocols on Uu and Un interfaces to improve type-I relay handover*"; 3GPP TSG RAN WG2 Meeting #66bis; R2-093735; Los Angeles, USA, Jun. 29-Jul. 3, 2009 (9 pages).
"*Joint PDCP protocols in a relay handover under different relay architectures*"; 3GPP TSG RAN WG2 Meeting #68; R2-096891; Jeju, Korea, Nov. 9-Nov. 13, 2009 (6 pages).
Form PCT/ISA/210; International Search Report dated Oct. 31, 2013 in corresponding International Application No. PCT/CN2013/070719 (2 pages) (2 pages English Translation).
International Search Report; Forms PCT/ISA/210, PCT/ISA/220, PCT/ISA/237, dated Jan. 18, 2013 in corresponding International Patent Application No. PCT/CN2013/070719 (11 pages).
PCDCP (Packet Data Convergence Protocol); Mobile Telecommunication standards; 3GPP standards; Universal Mobile Telecommunications System; retrieved from the Internet: http://en.wikipedia.org/w/index.php?title=PDCP&oldid=669149304 [retrieved on Jun. 29, 2015] (7 pages) (2 pages English Translation).

* cited by examiner

DATA TRANSMISSION METHOD, BASE STATION, AND USER EQUIPMENT

CROSS-REFERENCE TO RELATED APPLICATIONS

This application is a continuation of International Application No. PCT/CN2013/070719, filed on Jan. 18, 2013, which is hereby incorporated by reference in its entirety.

TECHNICAL FIELD

Embodiments of the present invention relate to a communications system, and in particular, to a data transmission method, a base station, and user equipment.

BACKGROUND

With development of the mobile internet, a user has a higher requirement for bandwidth. To improve a throughput of a network, multiple micro base stations (or sites) may be introduced to a cell of a macro base station (Macro evolved Node B, Macro eNB) to form a small cell. These micro base stations are deployed in hotspot areas for services, or the small cell of these micro base stations covers a coverage hole. In this way, when user equipment moves to these areas, a service of the user equipment may be switched to the small cell of the small base stations deployed in these areas, so as to implement service offloading or coverage makeup, and achieve a purpose of increasing a system capacity, improving a user throughput, or improving coverage.

However, generally the user equipment can communicate with only one base station (micro base station or macro base station) at a same moment. When the user equipment is in a position in which coverage of two base stations overlaps, even though a signal of the other base station meets a communication condition and there are remaining radio resources available, the radio resources of a cell of the other base station cannot be used, so that a throughput of the user equipment is limited by radio resources of one base station, and cannot be improved.

Therefore, how to use the radio resources of the other base station to improve the throughput of the user equipment is a problem to be resolved urgently.

SUMMARY

Embodiments of the present invention provide a data transmission method, a base station, and user equipment, which can improve a throughput of the user equipment.

According to a first aspect, a data transmission method is provided, including: establishing, by a first base station, a first Packet Data Convergence Protocol PDCP entity; sending, by the first base station, first configuration information to a second communications node, and sending second configuration information to user equipment, so as to establish a second radio bearer between the second communications node and the user equipment, where the first configuration information includes configuration information of a second PDCP entity of the second communications node, the second configuration information includes configuration information of a fourth PDCP entity of the user equipment, and the second radio bearer corresponds to the second PDCP entity and the fourth PDCP entity; sending, by the first base station, fourth configuration information to the second communications node, so as to establish a third bearer between the first base station and the second communications node, and sending an association relationship between the second radio bearer and the third bearer to the second communications node, where the association relationship is used to associate the second radio bearer with the third bearer; and using, by the first base station, the third bearer and the second radio bearer to transmit at least a part of data of service data between the first base station and the user equipment, where the first PDCP entity of the first base station and the second PDCP entity of the second communications node perform joint processing on the at least a part of data, and performing, in the first PDCP entity, a sequence number processing function on the service data.

According to a second aspect, a data transmission method is provided, including: receiving, by a second communications node, first configuration information, fourth configuration information, and an association relationship between a second radio bearer and a third bearer that are sent by a first base station; establishing, by the second communications node, a second PDCP entity according to the first configuration information, and establishing the second radio bearer with user equipment, where the first configuration information includes configuration information of the second PDCP entity, and the second radio bearer corresponds to the second PDCP entity and a fourth PDCP entity of the user equipment; establishing, by the second communications node, the third bearer with the first base station according to the fourth configuration information, and associating the second radio bearer with the third bearer according to the association relationship; and using, by the second communications node, the third bearer and the second radio bearer to transmit at least a part of data of service data between the first base station and the user equipment, where in a process of transmitting the service data, the second PDCP entity of the second communications node and a first PDCP entity of the first base station perform joint processing on the at least a part of data, and the first PDCP entity performs a sequence number processing function on the service data.

According to a third aspect, a data transmission method is provided, including: receiving, by user equipment, second configuration information sent by a first base station; establishing, by the user equipment, a fourth PDCP entity according to the second configuration information, and establishing a second radio bearer between the user equipment and a second communications node, where the second configuration information includes configuration information of the fourth PDCP entity, and the second radio bearer corresponds to the fourth PDCP entity and a second PDCP entity of the second communications node; and using, by the user equipment, the second radio bearer to transmit at least a part of data of service data between the first base station and the user equipment, where in a process of transmitting the service data, a first PDCP entity of the first base station and the second PDCP entity of the second communications node perform joint processing on the at least a part of data, and the first PDCP entity performs a sequence number processing function on the service data.

According to a fourth aspect, a base station is provided, including: a receiving module; an establishing module, configured to establish a first Packet Data Convergence Protocol PDCP entity; a sending module, configured to: send first configuration information to a second communications node, and send second configuration information to user equipment, so as to establish a second radio bearer between the second communications node and the user equipment, where the first configuration information includes configuration information of a second PDCP entity of the second communications node, the second configuration information includes configuration information of a fourth PDCP entity of the user equipment, and the second radio bearer corresponds to the second PDCP entity and the fourth PDCP entity; and send fourth configuration information to the second communications node, so as to establish a third bearer between the first base station and the second communications node, and send an association relationship between the second radio bearer and the third bearer to the second communications node, where the association relationship is used to associate the second radio bearer with the third bearer; and a control module, configured to use the third bearer and the second radio bearer to transmit, by using the receiving module and the sending module, at least a part of data of service data between the first base station and the user equipment, where the first PDCP entity established by the establishing module and the second PDCP entity perform joint processing on the at least a part of data, and perform, in the first PDCP entity, a sequence number processing function on the service data.

According to a fifth aspect, a communications node is provided, including: a sending module; a receiving module, configured to receive first configuration information, fourth configuration information, and an association relationship between a second radio bearer and a third bearer that are sent by a first base station; an establishing module, configured to establish a second Packet Data Convergence Protocol PDCP entity according to the first configuration information received by the receiving module, and establish the second radio bearer with user equipment, where the first configuration information includes configuration information of the second Packet Data Convergence Protocol PDCP entity, and the second radio bearer corresponds to the second PDCP entity and a fourth PDCP entity of the user equipment; and establish the third bearer with the first base station according to the fourth configuration information received by the receiving module, and associate the second radio bearer with the third bearer according to the association relationship; and a control module, configured to use the third bearer and the second radio bearer that are established by the establishing module to transmit, by using the sending module and the receiving module, at least a part of data of service data between the first base station and the user equipment, where the second PDCP entity of the second communications node and a first PDCP entity of the first base station perform joint processing on the at least a part of data, and the first PDCP entity performs a sequence number processing function on the service data.

According to a sixth aspect, user equipment is provided, including: a receiving module, configured to receive second configuration information sent by a first base station; a sending module; an establishing module, configured to establish a fourth PDCP entity according to the second configuration information received by the receiving module, and establish a second radio bearer between the user equipment and a second communications node, where the second configuration information includes configuration information of the fourth PDCP entity, and the second radio bearer corresponds to the fourth PDCP entity and a second PDCP entity of the second communications node; and a control module, configured to use the second radio bearer established by the establishing module to transmit, by using the sending module and the receiving module, at least a part of data of service data between the first base station and the user equipment, where in a process of transmitting the service data, a first PDCP entity of the first base station and the second PDCP entity of the second communications node perform joint processing on the at least a part of data, and the first PDCP entity performs a sequence number processing function on the service data.

According to the foregoing solutions, a first base station may use a third bearer between the first base station and a second communications node and a second radio bearer between the second communications node and user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1A:
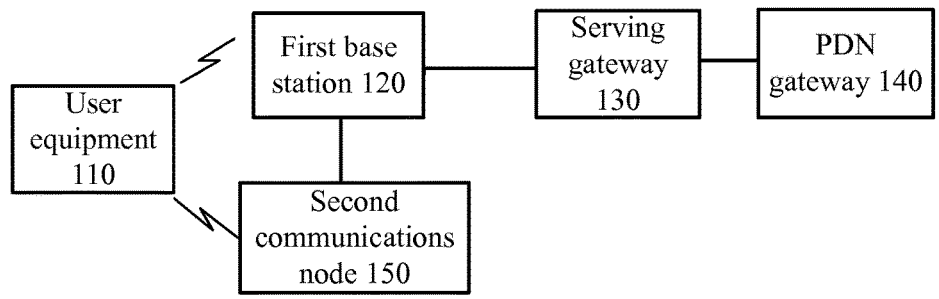
FIG. 1A is a schematic architecture diagram of a data transmission system according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of this application may be applied to various communications systems, such as a GSM (Global System for Mobile Communications) system, a CDMA (Code Division Multiple Access) system, a WCDMA (Wideband Code Division Multiple Access) system, a GPRS (general packet radio service), an LTE (Long Term Evolution) system, an LTE-A (Long Term Evolution Advanced) system, and a UMTS (Universal Mobile Telecommunications System), which is not limited in the embodiments of this application. However, for ease of description, the embodiments of this application are described by using an LTE system as an example.

A radio access network may include different network elements in different systems. For example, network elements on the radio access network in LTE and LTE-A include an eNB (eNodeB, evolved NodeB), and network elements on the radio access network in WCDMA include an RNC (radio network controller) and a NodeB. Similarly, other radio networks such as WiMax (Worldwide Interoperability for Microwave Access) may also use solutions similar to those in the embodiments of this application, and the only difference is that the related modules in a base station system may be different. No limitation is set by the embodiments of this application. However, for ease of description, the following embodiments are described by using an eNodeB as an example.

It should further be understood that in the embodiments of this application, user equipment (UE) may be but is not limited to a mobile station (MS), a mobile terminal, a mobile telephone, a mobile phone (handset), portable equipment, and the like. The user equipment may communicate with one or more core networks by using a radio access network (RAN), for example, a computer. The user equipment may further be a portable, pocket-sized, handheld, computer built-in, or in-vehicle mobile apparatus. The user equipment may be a mobile phone (or referred to as a "cellular" phone), a computer having a wireless communication function, or the like. The user equipment may further be a portable, pocket-sized, handheld, computer built-in, or in-vehicle mobile apparatus.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The micro base station in the embodiments of the present invention refers to a radio communications node, where coverage of a small cell corresponding to the micro base station is smaller than coverage of a macro cell corresponding to a macro base station, and the micro base station may include a pico base station, a home base station, a femto base station, a remote radio head (RRH), and the like.

To improve a throughput of the user equipment, a carrier aggregation (CA) technology and a coordinated multiple point technology have been proposed. Centralized scheduling and processing are used in the CA technology and the CoMP technology, and the eNB and the RRH are connected by using an optical fiber. Specifically, PDCP/RLC/MAC/PHY protocol layers are located in the eNB, data assembling and radio resource allocation are performed in the eNB, the eNB sends, to the RRH by using an optical fiber, an encapsulated data packet and radio resources that the RRH should use, and the RRH transmits data according to radio resources required by the eNB. For the CA technology or the CoMP technology, quick transmission (with a near zero delay) by using an optical fiber is a basic requirement for implementing the technology.

However, a backhaul network implemented by using an optical fiber is highly costly; therefore, a general backhaul network is implemented by using an Ethernet, an xDSL, a microwave, and the like. Compared with the backhaul network implemented by using the optical fiber, this type of backhaul network features a relatively long delay and relatively small bandwidth, that is, is limited in terms of delay and bandwidth.

Therefore, how to use this type of limited backhaul network and meanwhile improve the throughput of the user equipment is a problem to be resolved urgently.

FIG. 1A is a schematic architecture diagram of a data transmission system according to an embodiment of the present invention.

Referring to FIG. 1A, user equipment 110 may establish a first bearer with a first base station 120, and establish a second bearer with a second communications node 150, where the user equipment 110 establishes an EPS bearer with a public data network (PDN) gateway 140 by using the first base station 120 and a serving gateway 130. The first base station 120 establishes a third bearer with the second communications node 150. Herein, the first bearer and the second bearer are radio bearers, and are also referred to as a first radio bearer and a second radio bearer. When the second communications node is another base station, the third bearer is a bearer between base stations, and when the second communications node is another user equipment, the third bearer is a radio bearer between the another user equipment and the first base station. When service data corresponding to the EPS bearer is transmitted, one part of the data is transmitted by using the first radio bearer, and the other part of the data is transmitted by using the third bearer and the second radio bearer.

Specially, the user equipment may also establish only the second radio bearer with the second communications node 150, and does not need to establish the first radio bearer. In this case, all service data corresponding to the EPS bearer is transmitted by using the second radio bearer.

Figure 1B:
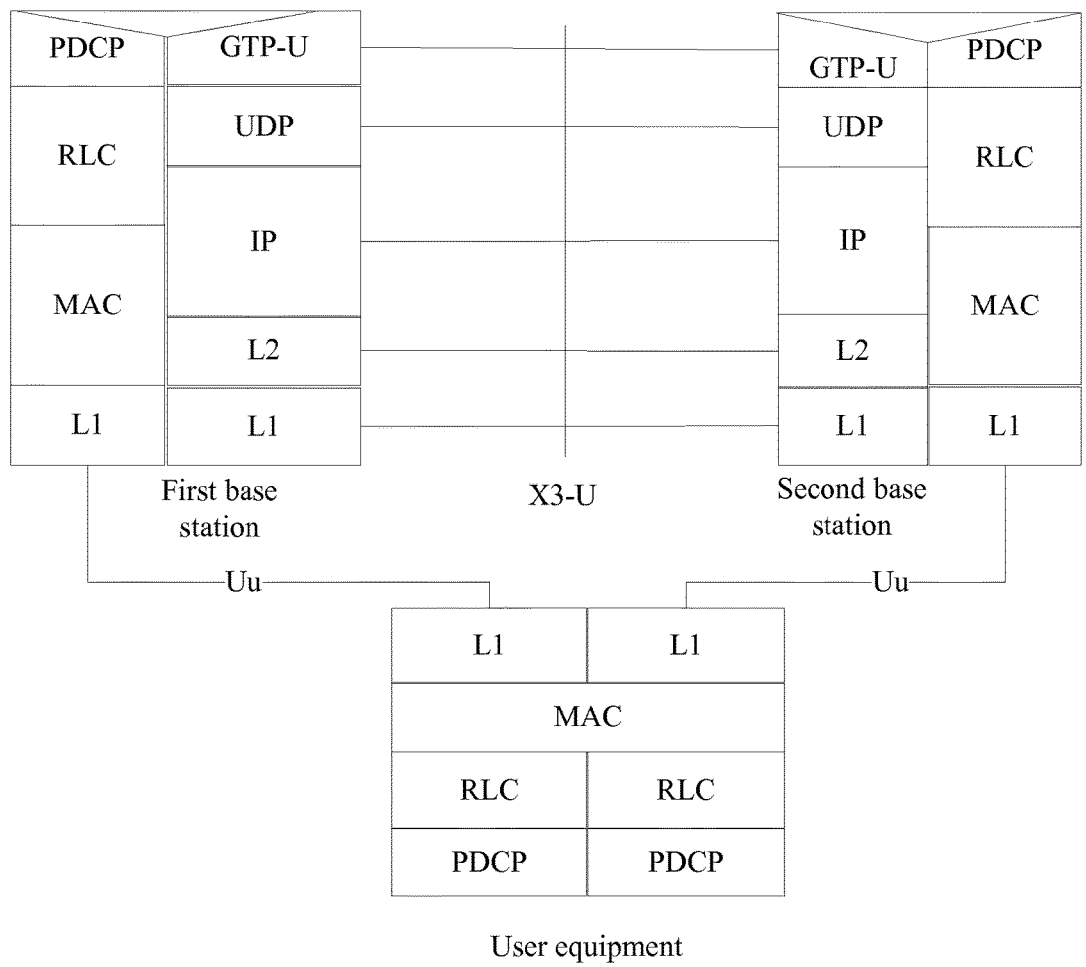
FIG. 1B is a schematic diagram of a user plane protocol stack according to an embodiment of the present invention.

FIG. 1B is a schematic diagram of a user plane protocol stack according to an embodiment of the present invention. This embodiment is described by using an example in which a second communications node is a second base station.

Referring to FIG. 1B, a first base station establishes a first radio bearer with user equipment through a Uu interface, the first base station and the second base station establish a third bearer between a GTP-U protocol entity of the first base station and a GTP-U protocol entity of the second base station through an X3-U interface, and the second base station establishes a second radio bearer with the user equipment through a Uu interface.

Figure 2:
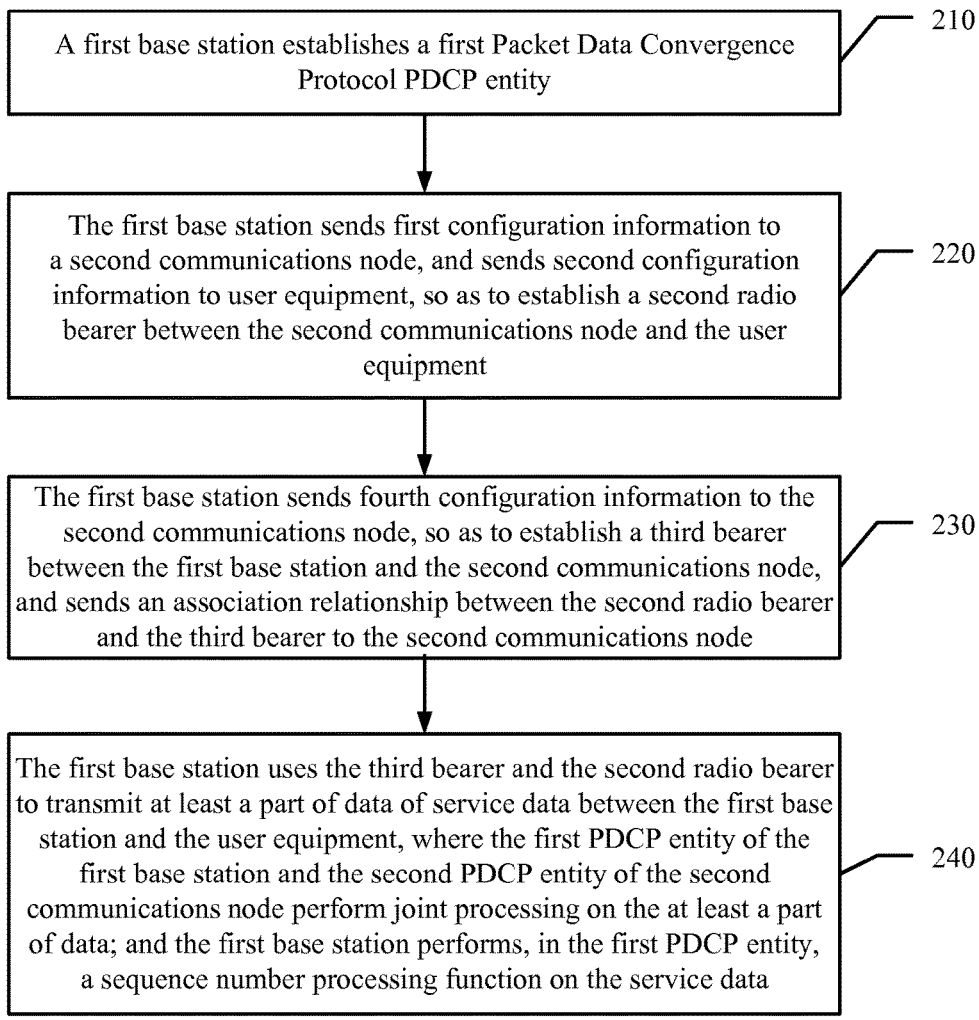
FIG. 2 is a schematic flowchart of a data transmission method according to an embodiment of the present invention.

FIG. 2 is a schematic flowchart of a data transmission method according to an embodiment of the present invention. The method in FIG. 2 is executed by a base station, and includes the following content.

210. A first base station establishes a first Packet Data Convergence Protocol (PDCP) entity.

A PDCP layer is located at layer 2 (L2) of a communications system. When a radio bearer is established, a corresponding function entity, hereinafter referred to as a PDCP entity, may be established at the PDCP layer. A service provided by the PDCP entity to an upper layer of the PDCP entity is referred to as a radio bearer (RB), for example, a signaling radio bearer (SRB) or a data radio bearer (DRB), where the SRB is used to bear Radio Resource Control (RRC) signaling, and the DRB is used to bear user data. The RB corresponds to an evolved packet system (EPS) bearer.

220. The first base station sends first configuration information to a second communications node, and sends second configuration information to user equipment, so as to establish a second radio bearer between the second communications node and the user equipment, where the first configuration information includes configuration information of a second PDCP entity of the second communications node, the second configuration information includes configuration information of a fourth PDCP entity of the user equipment, and the second radio bearer corresponds to the second PDCP entity and the fourth PDCP entity.

In this embodiment, because the first PDCP entity and the second PDCP entity jointly provide a service to an upper layer of the first PDCP entity, it may be considered that the second radio bearer is the service jointly provided by the first PDCP entity and the second PDCP entity to the upper layer of the first PDCP entity. For example, one part of PDCP functions are executed in the second PDCP entity, and the other part of the functions of the PDCP entity are executed in the first PDCP entity. Specifically, a second radio bearer may be formed by a PDCP entity of the first base station, a PDCP entity of the second communications node, a lower-layer protocol entity (for example, an L2/L1 layer protocol entity) of a PDCP entity of the second communications node, a lower-layer protocol entity (for example, an L2/L1 layer protocol entity) of the fourth PDCP entity of the user equipment, the fourth PDCP entity, and the like; in this case, it may be considered that on a base station side, the second radio bearer terminates at the first PDCP entity, and the foregoing second radio bearer established between the second communications node and the user equipment refers to a part of the second radio bearer. Alternatively, from another perspective, the second PDCP entity of the second communications node provides a service to an upper layer of the first PDCP entity by using the first PDCP entity of the first base station, that is, the second radio bearer is a service provided by the second PDCP entity; in this case, it may be considered that on a base station side, the second radio bearer terminates at the second PDCP entity, and the foregoing second radio bearer established between the second communications node and the user equipment refers to the second radio bearer as a whole. Specifically, the second radio bearer may be formed by a PDCP entity of the second communications node, a lower-layer protocol entity (for example, an L2/L1 layer protocol entity) of a PDCP entity of the second communications node, a lower-layer protocol entity (for example, an L2/L1 layer protocol entity) of the fourth PDCP entity of the user equipment, the fourth PDCP entity, and the like.

230. The first base station sends fourth configuration information to the second communications node, so as to establish a third bearer between the first base station and the second communications node, and sends an association relationship between the second radio bearer and the third bearer to the second communications node, where the association relationship is used to associate the second radio bearer with the third bearer.

For example, an association between the third bearer and the second radio bearer may be implemented by using an association (or mapping) relationship between an identifier of the third bearer and an identifier of the second radio bearer.

For example, the second communications node may be a radio communications node that has a scheduling function, or may be a base station of a same or different standard such as LTE, WiFi, UMTS, or CDMA, for example, an eNodeB, a NodeB, or a micro base station that has a scheduling function, and in this case, the third bearer may be a bearer between base stations; or the second communications node may also be user equipment. The third bearer in this embodiment of the present invention may be a radio bearer between a base station and user equipment.

The first base station may send the first configuration information by using an application layer signaling (for example, S1AP, X2AP, or X3AP) connection between the first base station and the second communications node. The first base station may send the second configuration information by using an RRC connection between the first base station and the user equipment, which is not limited in this embodiment of the present invention. For example, the first base station may also send the second configuration information by using an RRC connection between the second communications node and the user equipment.

The configuration information of the second PDCP entity is used to establish the second PDCP entity in the second communications node, and the configuration information of the fourth PDCP entity is used to establish the fourth PDCP entity in the user equipment.

The first configuration information or the second configuration information may further include a parameter used to establish a radio bearer, for example, a user identity, a bearer identifier, a configuration parameter of a PDCP entity, a configuration parameter of an RLC entity, or a MAC layer configuration parameter. The fourth configuration information may include a parameter used to establish the third bearer. For example, when the third bearer is a bearer between base stations, the fourth configuration information may include a user identity, a bearer identifier, transport layer tunnel address information, or the like. It should be understood that the first configuration information, the fourth configuration information, and the foregoing association relationship may be carried in one application layer signaling and sent to the second communications node, or may be separately sent to the second communications node, which is not limited in this embodiment of the present invention. In addition, a sequence of sending the first configuration information, the fourth configuration information, and the foregoing association relationship is also not limited in the present invention.

240. The first base station uses the third bearer and the second radio bearer to transmit at least a part of data of service data between the first base station and the user equipment, where the first PDCP entity of the first base station and the second PDCP entity of the second communications node perform joint processing on the at least a part of data; and performs, in the first PDCP entity, a sequence number processing function on the service data.

For example, the third bearer may be a transmission link established between the first base station and the second communications node, and be used to bear service data between the first base station and the second communications node. In a case in which the second communications node is another base station, the third bearer may be an X2 user plane interface bearer, an S1 user plane interface bearer, or an X3 user plane interface bearer. The second radio bearer may be a radio bearer established between the second communications node and the user equipment, and be used to bear service data between the second communications node and the user equipment. The foregoing service data is service data served by a radio bearer provided by the first PDCP entity, that is, a service data unit (SDU) of the first PDCP entity.

According to this embodiment of the present invention, joint processing may mean that service data of one PDCP (for example, a PDCP SDU) is processed by two associated PDCP entities successively, for example, joint processing performed by the first PDCP entity and the second PDCP entity and joint processing performed by a third PDCP entity and the fourth PDCP entity. Performing processing by the PDCP entity refers to performing a function, a process, storing, or an operation that is in the PDCP entity, and may specifically be functions mentioned in this embodiment of the present invention, such as sequence number processing, header compression processing, security processing, PDCP header processing, or buffer processing, or may be a sub-function of the foregoing function. An intersection set of functions is allowed for joint processing performed by the two PDCP entities in this embodiment of the present invention, for example, the second PDCP entity may buffer downlink data, and the first PDCP entity may or may not buffer the downlink data.

When downlink service data transmission is performed, the first base station may perform, in the first PDCP entity, sequence number processing (for example, numbering) on the service data, and transfer at least a part of data that undergoes processing and is of the service data to the second communications node through an interface (for example, a user plane part of the GPRS tunneling protocol, User plane part of GPRS tunneling protocol, GTP-U protocol interface) between the base stations, so that this part of data can be transmitted by using the second communications node. Specifically, the foregoing at least a part of data is transmitted by using the second radio bearer and the third bearer, that is, the at least a part of data is transmitted by using the first PDCP entity, the third bearer, the second PDCP entity, and the fourth PDCP entity. For transmission of the downlink service data, the foregoing sequence number processing may be numbering processing. When uplink service data transmission is performed, the second communications node transfers, to the first base station through the interface (for example, a GTP-U protocol interface) between the base stations, the at least a part of data that is received from the user equipment, that is, the at least a part of data is transmitted by using the second radio bearer and the third radio bearer. The first base station may perform, in the first PDCP entity, sequence number processing on the service data. Specifically, the at least a part of data is transmitted by using the fourth PDCP entity, the second PDCP entity, the third bearer, and the first PDCP entity. For transmission of the uplink service data, the foregoing sequence number processing may be reordering processing.

It can be learned from the foregoing that the first base station may control the second communications node by using application layer signaling that carries the first configuration information, and control the user equipment by using RRC signaling, so as to establish the third bearer between the first base station and the second communications node, and establish the second radio bearer between the user equipment and the second communications node, where there is a mapping relationship between the second radio bearer and a first radio bearer, and there is also a mapping relationship between the first radio bearer and an EPS bearer. In this way, the first base station receives, from a serving gateway (serving GW), at least a part of data (for example, a part or all) of service data corresponding to the EPS bearer, and transfers the at least a part of data to the user equipment by using the second communications node; or receives, by using the second communications node, at least a part of data sent by the user equipment, and transfers the at least a part of data to the serving gateway.

According to this embodiment of the present invention, a first base station may use a third bearer between the first base station and a second communications node and a second radio bearer between the second communications node and user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

In addition, at least a part of functions of a PDCP entity of the second communications node corresponding to the second radio bearer and a function of a lower-layer protocol entity at a PDCP layer are implemented in the second communications node; therefore, scheduling of the foregoing at least a part of data may be implemented in the second communications node, so that implementation of this embodiment of the present invention is not limited by a delay and bandwidth.

It should be understood that the first base station may control the user equipment to communicate with multiple second communications nodes, so that the user equipment separately establishes multiple second radio bearers with the multiple second communications nodes, and the multiple second communications nodes may separately use the radio bearers established with the user equipment to perform scheduling for the user equipment, so as to implement transmission of data on multiple paths. In this way, the user equipment may fully use radio resources of the multiple second communications nodes for data transmission, so as to further improve the throughput of the user equipment.

It should be further understood that the present invention may further be applied to a scenario in which user equipments directly communicate with each other, that is, the first base station may use a radio bearer between the first base station and second user equipment and a radio bearer between first user equipment and the second user equipment, and transmit service data between the first base station and the first user equipment by using the second user equipment, so that the first user equipment may fully use radio resources of the second user equipment for data transmission, so as to improve the throughput of the user equipment.

According to this embodiment of the present invention, the configuration information of the second PDCP entity includes information that instructs the second PDCP entity to perform a buffer function on the at least a part of data.

For example, the configuration information of the second PDCP entity may include an instruction used to enable or disable the buffer function of the second PDCP entity, and the first PDCP entity may not buffer the at least a part of data in a case in which the buffer function of the second PDCP entity is enabled. For downlink data transmission, if no buffer is set in the second PDCP entity, that is, a buffer in the first PDCP entity is used to buffer the at least a part of data, the first PDCP entity needs to perform primitive exchange with a lower-layer protocol entity (for example, RLC) of the second PDCP entity to determine whether the at least a part of data is correctly transmitted; therefore, massive signaling exchange needs to be performed between the first base station and the second communications node. If a buffer is set in the second PDCP entity, signaling between the first base station and the second communications node may be reduced, and signaling overheads may be thus reduced.

According to this embodiment of the present invention, the configuration information of the second PDCP entity further includes information that instructs the second PDCP entity to perform one part of functions of a robust header compression (Robust Header Compression, ROHC) (hereinafter referred to as header compression) processing function, a security processing function (for example, an encryption and/or integrity protection function), and a PDCP header processing function on the at least a part of data, where in step 240, in a process of transmitting the at least a part of data, the first base station further performs, in the first PDCP entity, the other part of functions, except the one part of functions, of the header compression processing function, the security processing function, and the PDCP header processing function on the at least a part of data that undergoes sequence number processing.

The header compression processing function, the security processing function, and the PDCP header processing function that are performed by the first PDCP entity and the second PDCP entity are a header compression function, an encryption and/or integrity protection function, and a PDCP header adding function respectively in a case of downlink service data transmission, and are a header decompression function, a decryption and/or integrity check function, and a PDCP header removal function respectively in a case of uplink service data transmission.

Downlink service data transmission is used as an example. The first base station may send, by using the third bearer, the at least a part of data processed by the first PDCP entity to the second communications node, so that the second communications node performs, in the second PDCP entity, all or a part of functions of the header compression function, the encryption and/or integrity protection function, and the PDCP header adding function on the at least a part of data according to the configuration information of the second PDCP entity. For example, an upper layer of the first PDCP entity of the first base station delivers downlink service data (for example, an IP data packet) from a radio bearer corresponding to the first PDCP entity to the first PDCP entity of the first base station, and the first PDCP entity performs sequence number (SN) processing (for example, numbering) on the service data to obtain a PDCP number, that is, allocates a hyper frame number (HFN) and a sequence number to the service data, or allocates a sequence number to the service data, so that the user equipment can perform sequence number processing (for example, reordering) on received downlink service data according to the PDCP number. The PDCP number may be the sequence number or a combination of the sequence number and the HFN. Specifically, reordering may be based on the hyper frame number and the sequence number, or reordering may be only based on the sequence number. In addition, in a case in which the foregoing service data is downlink data, for any function of the header compression function at the PDCP layer, the security processing function, and the PDCP header adding function, if the function is performed in the second PDCP entity, the first PDCP entity does not need to perform the function when processing the at least a part of data; or if the function is not performed in the second PDCP entity, the first PDCP entity needs to perform the function when processing the at least a part of data.

Optionally, in another embodiment, the configuration information of the second PDCP entity further includes information that instructs the second PDCP entity to perform a header compression processing function, a security processing function, and a PDCP header processing function on the at least a part of data.

Optionally, in another embodiment, in a process of transmitting the at least a part of data, the first base station further performs, in the first PDCP entity, a header compression processing function, a security processing function, and a PDCP header processing function on the at least a part of data. Alternatively, in another embodiment, in a process of transmitting the at least a part of data, the second communications node further performs, in the second PDCP entity, a header compression processing function, a security processing function, and a PDCP header processing function on the at least a part of data.

For example, for the at least a part of data, the second PDCP entity performs buffering only, and the header compression processing function, the security processing function, and the PDCP header processing function are all performed by the first PDCP entity.

According to this embodiment of the present invention, the first PDCP entity discards the at least a part of data after transmitting the at least a part of data to the second PDCP entity.

For example, in a case in which a buffer function is set in the second PDCP entity, the first PDCP entity discards the at least a part of data after transmitting, by using the third bearer, the at least a part of data to the second PDCP entity, so as to save buffer space of the first base station.

Optionally, in another embodiment, the first PDCP entity starts a timer after transmitting the at least a part of data to the second PDCP entity, and discards the at least a part of data after the timer expires. For example, one timer may be started for each data packet, and the data packet is discarded after the timer expires.

According to this embodiment of the present invention, the configuration information of the fourth PDCP entity includes information that instructs the fourth PDCP entity to perform the buffer function on the at least a part of data.

Optionally, in another embodiment, the service data includes first data and second data, where the second data is the at least a part of data. The method in FIG. 2 further includes: sending, by the first base station, third configuration information to the user equipment, so as to establish a first radio bearer between the first base station and the user equipment, where the third configuration information includes configuration information of a third PDCP entity of the user equipment, the first radio bearer corresponds to the first PDCP entity and the third PDCP entity; and using, by the first base station, the first radio bearer to transmit the first data of the service data between the first base station and the user equipment, where the first base station splits, in the first PDCP entity, the service data into the first data and the second data.

A new data transmission mechanism is introduced in this embodiment of the present invention, that is, the first radio bearer is established between the first base station and the user equipment to perform service data transmission, and the second radio bearer is established between the second communications node and the user equipment to perform data splitting. There is no direct mapping relationship between the second radio bearer and the EPS bearer, but an association relationship/mapping relationship is established between the second radio bearer and the first radio bearer. The second radio bearer may establish an indirect association relationship with the EPS bearer by using the association relationship established with the first radio bearer. These association relationships may be transferred to the second communications node by the first base station by using the first configuration information.

For example, when transmitting downlink service data that includes first data and second data, the first base station may transmit the first data by using the first PDCP entity, the first radio bearer, and the third PDCP entity, and the first base station may transmit the second data by using the first PDCP entity, the third bearer, the second PDCP entity, the second radio bearer, and the fourth PDCP entity. Specifically, the first PDCP entity forms a first PDCP protocol data unit (PDU) according to the first data, and submits the first PDCP PDU to a Radio Link Control (RLC) entity. The RLC entity forms a first RLC PDU according to the first PDCP PDU, and submits the first RLC PDU to a Media Access Control (MAC) entity of the first base station. The MAC entity of the first base station forms a first MAC PDU according to the first RLC PDU, performs scheduling processing, and transfers the first MAC PDU to a physical channel through a transmission channel; and the physical channel transmits corresponding data to the user equipment. The first PDCP entity performs processing of one part of PDCP functions on the second data, and submits processed second data to the second PDCP entity through a tunnel between GTP-Us, and the second PDCP entity performs processing of the other part of PDCP functions on the second data, so as to form a second PDCP PDU, and submits the second PDCP PDU to the RLC entity. The RLC entity forms a second RLC PDU according to the second PDCP PDU, and submits the second RLC PDU to the MAC entity. The MAC entity forms a second MAC PDU according to the second RLC PDU, performs scheduling processing, and transmits the formed second MAC PDU to the user equipment through the physical channel.

A sequence of the step of splitting and the step of numbering is not limited in this embodiment of the present invention, the service data may be first split, and then the split service data is numbered, or the service data may be first numbered, and then the numbered service data is split. A special case of splitting is that all service data corresponding to one EPS bearer is transmitted by using the second radio bearer.

A sequence of establishing the first radio bearer and the second radio bearer is not limited in this embodiment of the present invention, for example, the first radio bearer may be established before the second radio bearer is established or after the second radio bearer is established, or may be established at the same time when the second radio bearer is established.

According to this embodiment of the present invention, the configuration information of the third PDCP entity further includes information that instructs the third PDCP entity to perform one part of functions of the header compression processing function, the security processing function, and the PDCP header processing function on the second data, and the configuration information of the fourth PDCP entity further includes information that instructs the fourth PDCP entity to perform the other part of functions, except the one part of functions, of the header compression processing function, the security processing function, and the PDCP header processing function on the second data.

The header compression processing function, the security processing function, and the PDCP header processing function that are performed by the third PDCP entity and the fourth PDCP entity are a header decompression function, a decryption and/or integrity check function, and a PDCP header removal function respectively in a case of downlink service data transmission, and are a header compression function, an encryption and/or integrity protection function, and a PDCP header adding function respectively in a case of uplink service data transmission.

For example, when downlink data is transmitted, for any function of the header decompression function at the PDCP layer, the security function (for example, the decryption function and/or the integrity check function), and the PDCP header removal function, if the function is performed in the fourth PDCP entity, the third PDCP entity does not need to perform the function when processing the at least a part of data; or if the function is not performed in the fourth PDCP entity, the third PDCP entity needs to perform the function when processing the at least a part of data. When uplink data is transmitted, for any function of the header compression function at the PDCP layer, the security function (for example, the encryption function and/or the integrity protection function), and the PDCP header adding function, if the function is performed in the fourth PDCP entity, the third PDCP entity does not need to perform the function when processing the at least a part of data; or if the function is not performed in the fourth PDCP entity, the third PDCP entity needs to perform the function when processing the at least a part of data.

Optionally, in another embodiment, the service data includes first data and second data, where the second data is the at least a part of data. The method in FIG. 2 further includes: establishing, by the first base station, a first radio bearer between the first base station and the user equipment according to the second configuration information, where the first radio bearer corresponds to the first PDCP entity and the fourth PDCP entity; and using, by the first base station, the first radio bearer to transmit the first data of the service data between the first base station and the user equipment.

According to this embodiment of the present invention, the configuration information of the fourth PDCP entity further includes information that instructs the fourth PDCP entity to perform the header compression processing function, the security processing function, the PDCP header processing function, and the sequence number processing function on the at least a part of data.

It should be understood that a sequence of the functions performed by the foregoing PDCP entities is not limited in this embodiment of the present invention. For example, the security processing function may be performed before the header compression function is performed, or the header compression function may be performed before the security processing function is performed.

According to this embodiment of the present invention, the method in FIG. 2 further includes: receiving, by the first base station, traffic status information sent by the second communications node, and performing, in the first PDCP entity, traffic control on the at least a part of data according to the traffic status information, where the traffic status information includes a buffer status indication, which is used to indicate a status for occupying a buffer of the second PDCP entity by the at least a part of data; or the traffic status information includes a traffic control indication, which is used to indicate a variation or maintenance of traffic of the at least a part of data.

For example, a PDCP entity of the second communications node generates a piece of traffic status information, an application protocol layer (for example, the X2AP, X3AP, or S1AP protocol) between base stations that is of the second communications node generates traffic status signaling (or referred to as traffic control signaling), and the second communications node sends the traffic status information to the first base station by using the traffic control signaling; and the first base station transfers the traffic status information to the first PDCP entity of the first base station for processing.

The buffer status indication is used to indicate a buffer status of the second PDCP entity, for example, the buffer is empty or the second PDCP entity has already sent all the second data. To implement smooth mobility of the service data when the service data is switched between the second PDCP entity and the first PDCP entity, when learning, according to the buffer status indication, that the second PDCP entity has sent all the second data, the first base station may start sending the first data to the user equipment by using the first PDCP entity, and before learning that the second PDCP entity has sent all the second data, stop transmitting, by using the third bearer, the second data to the second PDCP entity.

The traffic control indication is used to directly instruct the first PDCP entity to increase, reduce, or maintain traffic of the second data. For example, if the traffic control indication is 1, the traffic of the second data is increased, if the traffic control indication is 0, the traffic of the second data is reduced, and if no traffic control indication is received, the traffic of the second data is maintained. Further, the traffic control indication may further include a recommended value, for example, carrying 1000 indicates that increasing by 1000 bytes per second is recommended.

According to this embodiment of the present invention, the method in FIG. 2 further includes: sending, by the first base station, an association indication parameter to the user equipment, where the association indication parameter is used to associate the first radio bearer with the second radio bearer.

Specifically, radio bearer identifiers of the first radio bearer and the second radio bearer may be the same, that is, association (or mapping) is performed by using a same identifier. Optionally, radio bearer identifiers of the first radio bearer and the second radio bearer may also be different. For example, when the radio bearer identifiers of the first radio bearer and the second radio bearer are different, the first base station may send the association indication parameter to the user equipment, so that the user equipment associates (or maps) the first radio bearer with the second radio bearer.

For example, the first base station may directly send the association indication parameter to the user equipment, or may send the association indication parameter to the user equipment by using the second communications node. For example, for downlink service data, the fourth PDCP entity of the user equipment transfers processed service data to the third PDCP entity for processing, and the third PDCP entity reorders, according to the association indication parameter, the first data transmitted by the first radio bearer and the second data transmitted by the second radio bearer.

According to this embodiment of the present invention, the method in FIG. 2 further includes: sending, by the first base station, an association indication parameter to the second communications node, where the association indication parameter is used to associate the first radio bearer with the second radio bearer.

Specifically, radio bearer identifiers of the first radio bearer and the second radio bearer may be the same, that is, association (or mapping) is performed by using a same identifier. Optionally, radio bearer identifiers of the first radio bearer and the second radio bearer may also be different. For example, when the radio bearer identifiers of the first radio bearer and the second radio bearer are different, the first base station may send the association indication parameter to the second communications node, so that the second communications node associates (or maps) the first radio bearer with the second radio bearer.

For example, for uplink service data, the second PDCP entity of the second communications node transfers, by using the corresponding third bearer, processed service data to the first PDCP entity of the first base station for processing, and the first PDCP entity reorders the second data.

Optionally, in another embodiment, the method in FIG. 2 further includes: using, by the first PDCP entity, the first radio bearer to receive one part of uplink data of the uplink service data from the third PDCP entity, using the second radio bearer and the third bearer to receive the other part of uplink data, except the one part of uplink data, of the uplink service data from the fourth PDCP entity, reordering the one part of uplink data and the other part of data in the buffer of the first PDCP entity, and uploading the one part of data and the other part of data that are reordered to the upper layer of the first PDCP entity.

Contrary to downlink service data transmission, after using the first radio bearer to receive one part of uplink data and using the third bearer and the second radio bearer to receive the other part of uplink data, the first PDCP entity may reorder the two parts of uplink data according to a PDCP number allocated by the user equipment to the uplink data.

Optionally, in another embodiment, the method in FIG. 2 further includes: using, by the first PDCP entity, the second radio bearer and the third bearer to receive all uplink data of the uplink service data from the fourth PDCP entity, reordering all the data of the uplink service data in the buffer of the first PDCP entity, and uploading all reordered data of the uplink service data to the upper layer of the first PDCP entity.

Optionally, in another embodiment, the method in FIG. 2 further includes: using, by the first PDCP entity, the first radio bearer to receive all data of the uplink service data from the third PDCP entity, reordering all the data of the uplink service data in the buffer of the first PDCP entity, and uploading all reordered data of the uplink service data to the upper layer of the first PDCP entity.

In step 240, the first base station may use the third bearer and the second radio bearer to transmit all data of the service data between the first base station and the user equipment.

For example, all the foregoing data is all downlink data or all uplink data of an EPS bearer. One PDCP entity corresponds to one EPS bearer. When there are multiple EPS bearers, that is, when there are multiple PDCP entities, all the foregoing data refers to all data of a PDCP entity. For example, in a case in which a fault occurs in the first radio bearer, all downlink data or uplink data of an EPS bearer corresponding to the first radio bearer is transmitted by using the second radio bearer; in this way, reliability of data transmission of the user equipment may be improved.

According to this embodiment of the present invention, the service data is uplink service data. In step 240, the first PDCP entity may use the first radio bearer to receive one part of data of the uplink service data from the third PDCP entity, and use the second radio bearer to receive the other part of data, except the one part of data, of the uplink service data from the fourth PDCP entity, reorder the one part of data and the other part of data in the buffer of the first PDCP entity, and upload the one part of data and the other part of data that are reordered to the upper layer of the first PDCP entity.

Optionally, in another embodiment, the service data is uplink service data. In step 240, the first PDCP entity may use the second radio bearer and the third bearer to receive all data of the uplink service data from the fourth PDCP entity, reorder all the data of the uplink service data in the buffer of the first PDCP entity, and upload all reordered data of the uplink service data to the upper layer of the first PDCP entity.

Optionally, in another embodiment, the service data is uplink service data. In step 240, the first PDCP entity may use the first radio bearer to receive all data of the uplink service data from the third PDCP entity, reorder all the data of the uplink service data in the buffer of the first PDCP entity, and upload all reordered data of the uplink service data to the upper layer of the first PDCP entity.

According to this embodiment of the present invention, the first configuration information further includes a first preset time, so that the second PDCP entity discards the at least a part of data after the first preset time expires.

According to this embodiment of the present invention, the second configuration information or the third configuration information further includes a second preset time and/or a waiting window, so that the user equipment reorders the service data according to the second preset time and/or the waiting window.

According to this embodiment of the present invention, the configuration information of the second PDCP entity or the configuration information of the fourth PDCP entity further includes a function enabling/disabling indication, which is used to instruct a PDCP entity corresponding to the configuration to enable or disable at least one of the header compression processing function, the security processing function, and the PDCP header processing function.

For example, the first base station sends, to the second communications node and the user equipment, an indication that is used to enable or disable a PDCP entity function. For example, for a PDCP entity on a sending side (for example, the first PDCP entity and the second PDCP entity when downlink service data is transmitted, or the third PDCP entity and the fourth PDCP entity when uplink service data is transmitted), the foregoing preconfigured functions may include at least one of the header compression function, the security processing function (for example, integrity protection or encryption), and the PDCP header adding function. For a PDCP entity on a receiving side (for example, the third PDCP entity and the fourth PDCP entity when downlink service data is transmitted, or the first PDCP entity and the second PDCP entity when uplink service data is transmitted), the foregoing preconfigured functions may include at least one of the decompression function, the security processing function (for example, integrity check or decryption), and the PDCP header removal function.

Optionally, in another embodiment, the configuration information of the second PDCP entity or the configuration information of the fourth PDCP entity further includes a radio bearer type indication or a communications node type indication, which is used to instruct a PDCP entity corresponding to the configuration to use at least one of the header compression processing function, the security processing function, and the PDCP header processing function.

For example, for a radio bearer type (for example, the second radio bearer described in the present invention), the second PDCP entity may use the buffer function, the PDCP header processing function, the security processing function, and the header compression processing function, and the first PDCP entity performs the sequence number processing function. For another example, for another radio bearer type, the second PDCP entity may use the buffer function only, and other PDCP functions are performed by the first PDCP entity.

Alternatively, for example, for a splitting communications node (for example, the second communications node described in the present invention), a PDCP entity of the communications node may use the buffer function, the PDCP header processing function, the security processing function, and the header compression processing function, and a PDCP entity of a control communications node (for example, the first base station described in the present invention) of the splitting communications node performs the sequence number processing function. For another example, for another splitting communications node, the PDCP entity may use the buffer function only, and other PDCP functions are performed by the PDCP entity of the control communications node of the splitting communications node.

Because a PDCP entity of the first base station processes more functions, design of a second base station may be simplified. For example, for a security function of downlink service data, because the PDCP entity of the first base station performs security processing, it is ensured that information in the second base station is always secure, thereby avoiding introducing a security processing mechanism for the second base station. Further, for the user equipment, a security context of the user equipment needs to correspond to only a security context of the first base station, so that the security context can be synchronously updated by using control signaling between the first base station and the user equipment.

In addition, during switching, data continuity is implemented by using a PDCP entity; because the PDCP entity of the first base station processes more functions, the first base station knows that which data has been successfully transmitted, and which has not been confirmed as being successfully transmitted; when the second radio bearer of the user equipment needs to be migrated from the second communications node to a new communications node, the first base station may continue to forward, to the new communications node for processing, PDCP data that has not been confirmed as being successfully transmitted.

Figure 3:
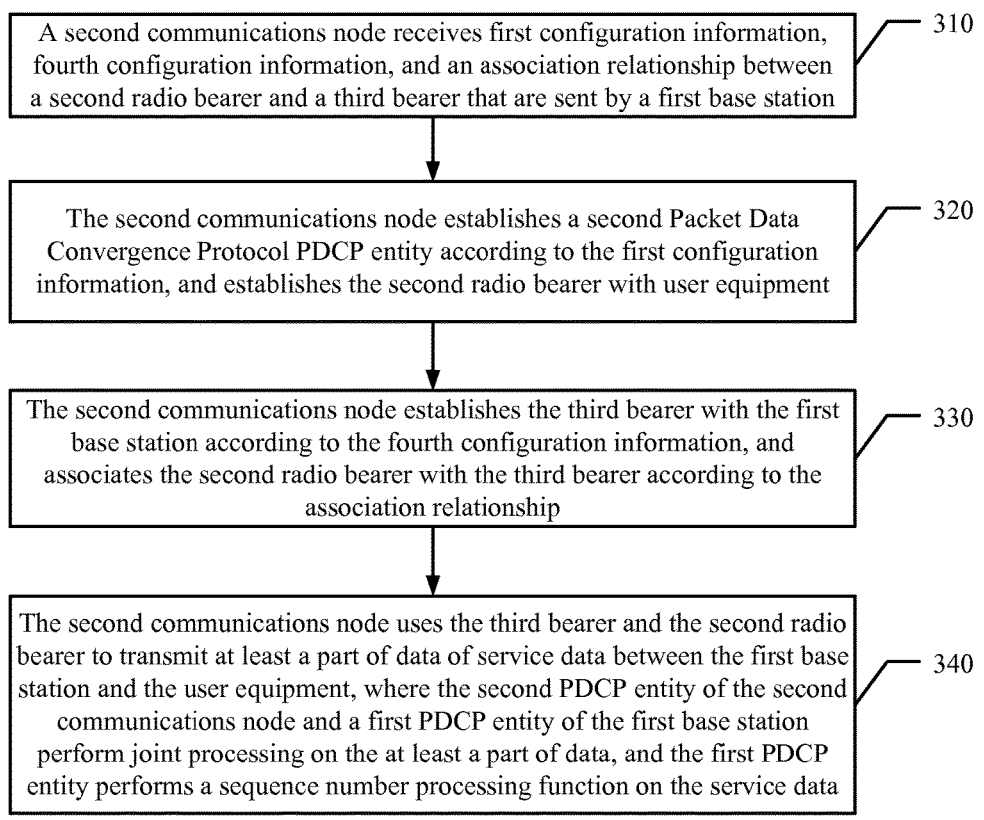
FIG. 3 is a schematic flowchart of a data transmission method according to another embodiment of the present invention.

FIG. 3 is a schematic flowchart of a data transmission method according to another embodiment of the present invention. The method in FIG. 3 is executed by a radio communications node.

310. A second communications node receives first configuration information, fourth configuration information, and an association relationship between a second radio bearer and a third bearer that are sent by a first base station.

320. The second communications node establishes a second PDCP entity according to the first configuration information, and establishes the second radio bearer with user equipment, where the first configuration information includes configuration information of the second PDCP entity, and the second radio bearer corresponds to the second PDCP entity and a fourth PDCP entity of the user equipment.

330. The second communications node establishes the third bearer with the first base station according to the fourth configuration information, and associates the second radio bearer with the third bearer according to the association relationship.

340. The second communications node uses the third bearer and the second radio bearer to transmit at least a part of data of service data between the first base station and the user equipment, where in a process of transmitting the service data, the second PDCP entity of the second communications node and a first PDCP entity of the first base station perform joint processing on the at least a part of data, and the first PDCP entity performs a sequence number processing function on the service data.

According to this embodiment of the present invention, a second communications node uses the third bearer and a second radio bearer to transmit at least a part of data of service data between a first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the configuration information of the second PDCP entity includes information that instructs the second PDCP entity to perform a buffer function on the at least a part of data; the method in FIG. 3 further includes: performing, by the second PDCP entity, the buffer function on the at least a part of data according to the configuration information of the second PDCP entity, so as to store the at least a part of data in a buffer of the second communications node.

According to this embodiment of the present invention, the second PDCP entity discards the buffered at least a part of data after receiving a delivery success indication sent by a lower-layer protocol entity of the second PDCP entity.

For example, for each data packet (for example, a PDCP PDU) buffered by the second PDCP entity of the second communications node, when a lower-layer protocol entity of a PDCP entity of the second communications node indicates to the PDCP entity that the PDCP PDU has been successfully transmitted, the second PDCP entity discards the buffered PDCP PDU.

For example, for each PDCP SDU received from the first base station, when a PDCP status report sent by the user equipment to the second communications node indicates that the PDCP SDU has been successfully received, the second PDCP entity discards the buffered data.

It should be further understood that the lower-layer protocol entity of the second communications node may be an L1/L2 protocol entity having a standard different from that of the first base station. Therefore, an interface between a conventional LTE PDCP layer and an LTE RLC layer may be extended to a cross radio access technology (Radio Access Technology, RAT) system, so that by using a unified interface, it can be implemented that base stations of various standards jointly provide radio resources to the user equipment, improving a throughput of the user equipment.

Optionally, in another embodiment, the second PDCP entity discards the buffered at least a part of data after a preset time.

For example, one timer is started for each PDCP service data unit (Service Data Unit) received from the first base station, and the second PDCP entity discards the buffered data when the timer for the PDCP SDU expires.

According to this embodiment of the present invention, the configuration information of the second PDCP entity further includes information that instructs the second PDCP entity to perform at least a part of functions of a header compression processing function, a security processing function, and a PDCP header processing function on the at least a part of data, so that the second communications node performs, in the second PDCP entity, processing of the at least a part of functions of the header compression processing function, the security processing function, and the PDCP header processing function on the at least a part of data according to the configuration information of the second PDCP entity.

For example, when downlink service data is transmitted, in a case in which the first base station has performed PDCP numbering processing on the at least a part of data, the second communications node may directly use the number for data transmission without renumbering the data in the second PDCP entity of the second communications node. The second communications node processes and buffers the at least a part of data in the second PDCP entity, and submits processed and buffered data to the lower-layer protocol entity; in this way, by using the second radio bearer established between the second communications node and the user equipment, the service data may be transmitted to the user equipment. The second PDCP entity of the second communications node may be a PDCP entity of a particular type and have a part of PDCP functions, for example, the second PDCP entity may have only a function of performing buffer processing on a PDCP PDU sent by the first base station.

Optionally, the service data may also be numbered in the second communications node, so that a number allocated by the second communications node to the service data is consistent with the number allocated by the first base station to the service data.

According to this embodiment of the present invention, the service data includes first data and second data, where the second data is the at least a part of data, and the first data is transmitted by using a first radio bearer between the first base station and the user equipment.

Optionally, in another embodiment, the method in FIG. 3 further includes: feeding back, by the second communications node, traffic status information to the first base station, so that the first base station performs traffic control on the at least a part of data according to the traffic status information, where the traffic status information includes a buffer status indication, which is used to indicate a status for occupying a buffer of the second PDCP entity by the at least a part of data; and/or the traffic status information includes a traffic control indication, which is used to indicate a variation or maintenance of traffic of the at least a part of data.

Optionally, in another embodiment, the method in FIG. 3 further includes: receiving, by the second communications node, an association indication parameter sent by the first base station, where the association indication parameter is used to associate the first radio bearer with the second radio bearer.

Optionally, in another embodiment, the method in FIG. 3 further includes: using, by the second PDCP entity, the second radio bearer to transmit a part of data of uplink service data from the fourth PDCP entity to the first PDCP entity.

In step 340, the second PDCP entity may use the second radio bearer to transmit a part of data of uplink service data from the fourth PDCP entity to the first PDCP entity.

Optionally, in another embodiment, the method in FIG. 3 further includes: using, by the second PDCP entity, the second radio bearer to transmit all data of uplink service data from the fourth PDCP entity to the first PDCP entity.

In step 340, the second communications node may use the second radio bearer to transmit all data of the service data between the first base station and the user equipment.

According to this embodiment of the present invention, the configuration information of the second PDCP entity or configuration information of the fourth PDCP entity further includes a function enabling/disabling indication, which is used to instruct a PDCP entity corresponding to the configuration to enable or disable at least one of the header compression processing function, the security processing function, and the PDCP header processing function.

Optionally, in another embodiment, the configuration information of the second PDCP entity or configuration information of the fourth PDCP entity further includes a radio bearer type indication, which is used to instruct a PDCP entity corresponding to the configuration to perform at least one of the header compression processing function, the security processing function, and the PDCP header processing function.

The foregoing describes the data transmission method provided in the embodiments of the present invention with reference to FIG. 2 and FIG. 3 from a perspective of a base station, and the following describes the data transmission method provided in this embodiment of the present invention in detail from a perspective of user equipment.

Figure 4:
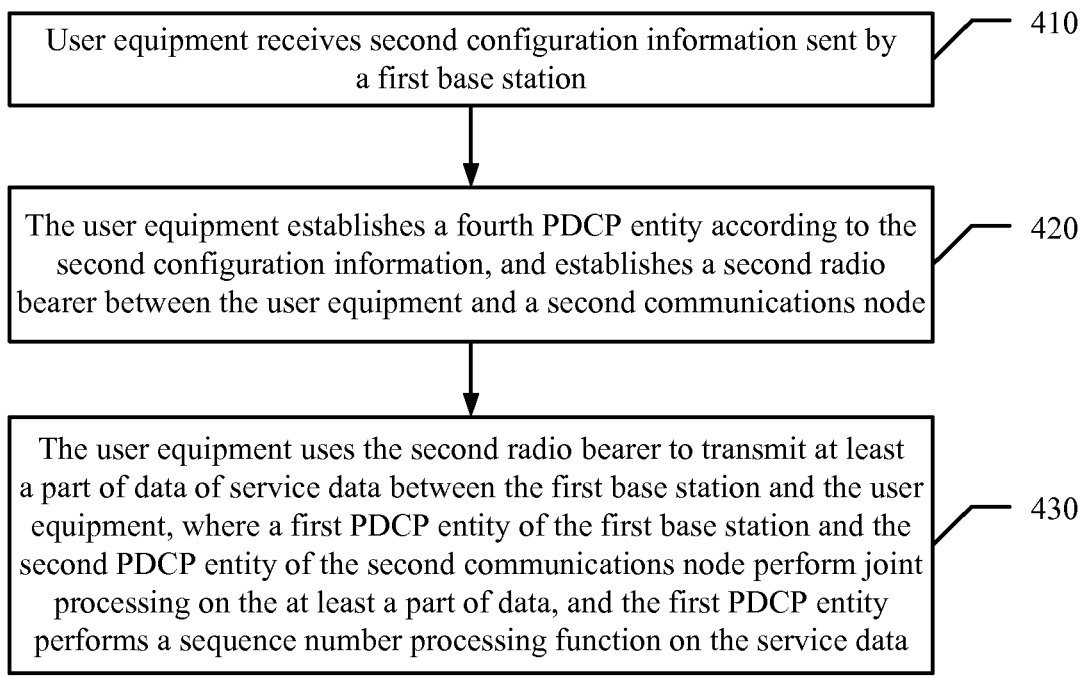
FIG. 4 is a schematic flowchart of a data transmission method according to still another embodiment of the present invention.

FIG. 4 is a schematic flowchart of a data transmission method according to an embodiment of the present invention.

410. User equipment receives second configuration information sent by a first base station.

420. The user equipment establishes a fourth PDCP entity according to the second configuration information, and establishes a second radio bearer between the user equipment and a second communications node, where the second configuration information includes configuration information of the fourth PDCP entity, and the second radio bearer corresponds to the fourth PDCP entity and a second PDCP entity of the second communications node.

430. The user equipment uses the second radio bearer to transmit at least a part of data of service data between the first base station and the user equipment, where in a process of transmitting the service data, a first PDCP entity of the first base station and the second PDCP entity of the second communications node perform joint processing on the at least a part of data, and the first PDCP entity performs a sequence number processing function on the service data.

According to this embodiment of the present invention, user equipment may use a third bearer between a first base station and a second communications node and a second radio bearer between the second communications node and the user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the service data includes first data and second data, and the second data is the at least a part of data; the method in FIG. 4 further includes: receiving, by the user equipment, third configuration information sent by the first base station, establishing a third PDCP entity according to the third configuration information, and establishing a first radio bearer between the first base station and the user equipment, where the third configuration information includes configuration information of the third PDCP entity, and the first radio bearer corresponds to the first PDCP entity and the third PDCP entity; and using, by the user equipment, the first radio bearer to transmit the first data of the service data between the first base station and the user equipment, where when transmitting the service data, the user equipment performs, in the third PDCP entity, the sequence number processing function on the service data.

According to this embodiment of the present invention, the configuration information of the fourth PDCP entity further includes information that instructs the fourth PDCP entity to perform at least a part of functions of a header compression processing function, a security processing function, and a PDCP header processing function on the second data, so that the user equipment performs, in the fourth PDCP entity, processing of one part of functions of the header compression processing function, the security processing function, and the PDCP header processing function on the at least a part of data according to the configuration information of the fourth entity, and performs, in the third PDCP entity, processing of the other part of functions, except the one part of functions, of the header compression processing function, the security processing function, and the PDCP header processing function on the second data according to the configuration information of the third PDCP entity.

Optionally, in another embodiment, the service data includes first data and second data, and the second data is the at least a part of data; the method in FIG. 4 further includes: establishing, by the user equipment, a first radio bearer between the first base station and the user equipment according to the second configuration information, where the first radio bearer corresponds to the first PDCP entity and the third PDCP entity; and using, by the user equipment, the first radio bearer to transmit the first data of the service data between the first base station and the user equipment, where when transmitting the service data, the user equipment performs, in the fourth PDCP entity, the sequence number processing function on the service data.

For example, the user equipment may reorder the first data and the second data according to PDCP numbers generated by the first base station, and submit, according to a sequence (in ascending order) of the numbers, PDCP SDUs obtained after reordering to an upper-layer protocol entity (usually an IP layer) corresponding to a PDCP entity of the first base station.

According to this embodiment of the present invention, the configuration information of the fourth PDCP entity further includes information that instructs the fourth PDCP entity to perform a header compression processing function, a security processing function, a PDCP header processing function, and the sequence number processing function on the second data, so that the user equipment performs, in the fourth PDCP entity, the header compression processing function, the security processing function, the PDCP header processing function, and the sequence number processing function on the second data according to the configuration information of the fourth PDCP entity.

According to this embodiment of the present invention, the configuration information of the fourth PDCP entity includes information that instructs the fourth PDCP entity to perform a buffer function on the at least a part of data; the method further includes: performing, by the user equipment, the buffer function on the at least a part of data according to the configuration information of the second PDCP entity, so as to store the at least a part of data in a buffer of the user equipment.

Optionally, in another embodiment, the method in FIG. 4 further includes: receiving, by the user equipment, an association indication parameter sent by the first base station, where the association indication parameter is used to associate the first radio bearer with the second radio bearer, so that the user equipment performs, in the third PDCP entity and the fourth PDCP entity, joint processing on the at least a part of data according to the association indication parameter.

Optionally, in another embodiment, the method in FIG. 4 further includes: splitting, by the third PDCP entity, uplink service data into third data and fourth data, and numbering the third data and the fourth data; using, by the third PDCP entity, the first radio bearer to send the third data to the first base station; and using, by the fourth PDCP entity, the second radio bearer to send the fourth data to the first base station.

After the first radio bearer, the third bearer, and the second radio bearer are established, when uplink service data needs to be transmitted, the user equipment may directly use the first radio bearer to send one part of the uplink data and use the third bearer and the second radio bearer to send the other part of the uplink data.

Optionally, in another embodiment, the method in FIG. 4 further includes: numbering, by the fourth PDCP entity, the uplink service data, and using the second radio bearer to send all data of the uplink service data to the first base station.

Optionally, in another embodiment, the method in FIG. 4 further includes: numbering, by the third PDCP entity, the uplink service data, and using the second radio bearer to send all data of the uplink service data to the first base station.

Optionally, in another embodiment, the method in FIG. 4 further includes: numbering, by the third PDCP entity, the uplink service data, and sending the numbered uplink service data to the fourth PDCP entity; and using, by the fourth PDCP entity, the second radio bearer to send all data of the uplink service data to the first base station.

According to this embodiment of the present invention, in step 430, the user equipment may use the second radio bearer to transmit all data of the service data between the first base station and the user equipment.

In step 430, the third PDCP entity may split uplink service data into third data and fourth data, and number the third data and the fourth data, the third PDCP entity uses the first radio bearer to send the third data to the first base station, and the fourth PDCP entity uses the second radio bearer to send the fourth data to the first base station.

In step 430, the fourth PDCP entity may number the uplink service data, and use the second radio bearer to send all data of the uplink service data to the first base station.

In step 430, the third PDCP entity may number the uplink service data, and use the second radio bearer to send all data of the uplink service data to the first base station.

In step 430, the third PDCP entity may number the uplink service data, and send the numbered uplink service data to the fourth PDCP entity, and the fourth PDCP entity uses the second radio bearer to send all data of the uplink service data to the first base station.

Optionally, in another embodiment, the second configuration information or the third configuration information further includes a second preset time and/or a waiting window, so that the user equipment performs the sequence number processing function on the service data according to the second preset time and/or the waiting window.

A waiting window K may also be referred to as a reordering window, which indicates a maximum quantity of data packets waiting for reordering. The waiting window K and a timer may be configured together. For example, the third PDCP entity corresponding to the first radio bearer configures a timer according to the third configuration information. When the third PDCP entity receives the $N^{th}$ data packet, if the $M^{th}$ data packet prior to the $N^{th}$ data packet is not received, the third PDCP entity starts the timer for the $M^{th}$ data packet. A specific determining criterion for reordering may be: N>M, and an absolute value of a difference between N and M is greater than the waiting window K. Optionally, in a case in which numbers are reset in a cyclic location, a specific determining criterion for reordering is: N<M, and an absolute value of a difference between N and M is greater than the waiting window K. If the $M^{th}$ data packet arrives before the timer expires, the timer is released, and a received data packet having a larger sequence number than the $M^{th}$ data packet is delivered to an upper layer. If the timer expires, the received data packet having a larger sequence number than the $M^{th}$ data packet is delivered to the upper layer. If the $M^{th}$ data packet is received after the timer expires, the $M^{th}$ data packet is discarded and is no longer delivered to the upper layer.

Optionally, in another embodiment, the foregoing configuration information further includes a function enabling/disabling indication, which is used to instruct a PDCP entity corresponding to the configuration information of the second PDCP entity or the configuration information of the fourth PDCP entity to enable or disable at least one of the header compression processing function, the security processing function, and the PDCP header processing function.

Optionally, in another embodiment, the configuration information of the second PDCP entity or the configuration information of the fourth PDCP entity further includes a radio bearer type indication, which is used to instruct a PDCP entity corresponding to the foregoing configuration to use at least one of the header compression processing function, the security processing function, and the PDCP header processing function.

The following describes the embodiments of the present invention in more detail with reference to specific examples.

Figure 5A:
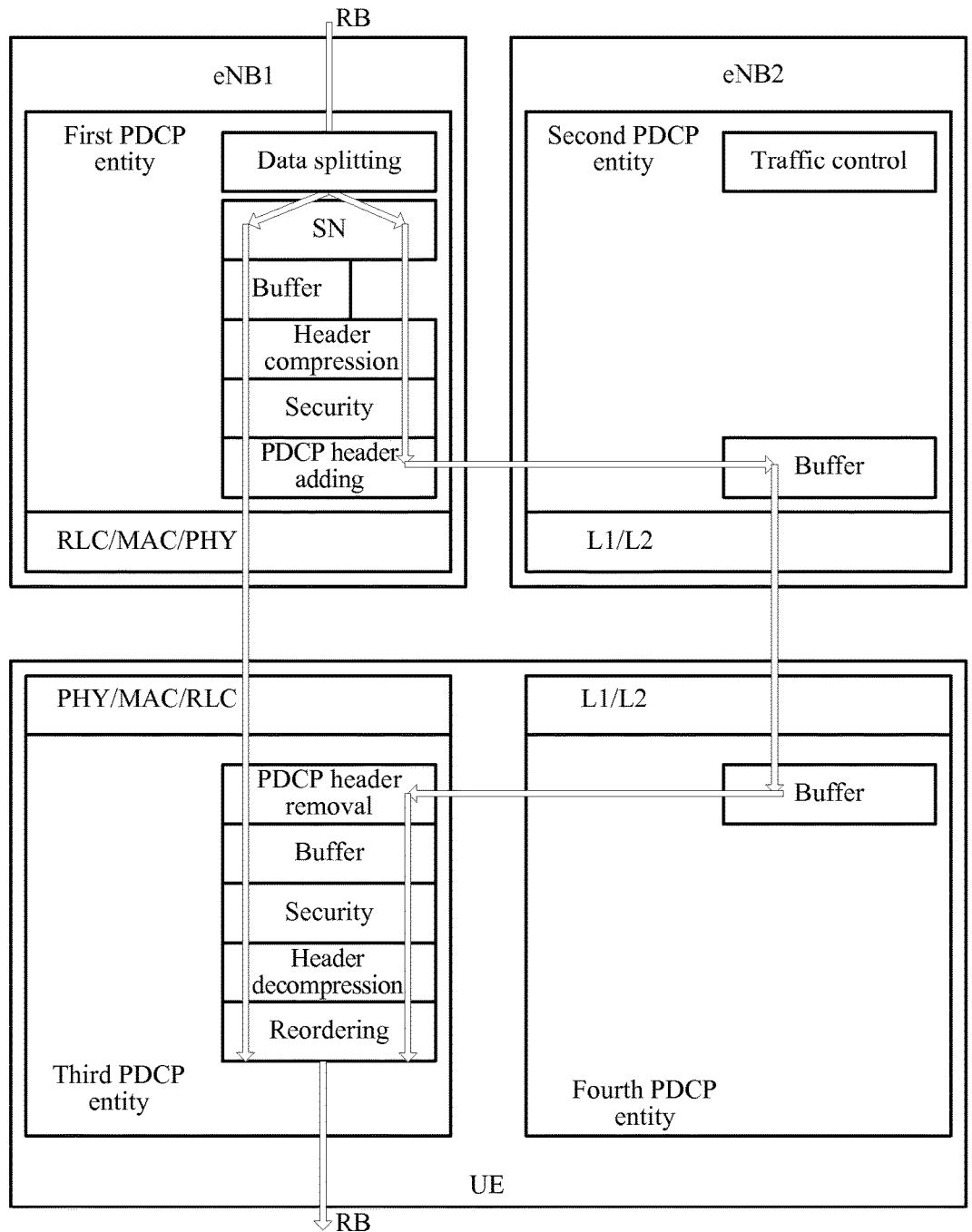
FIG. 5A is a schematic diagram of a cooperative relationship between PDCP entities according to an embodiment of the present invention.

FIG. 5A is a schematic diagram of a cooperative relationship between PDCP entities according to an embodiment of the present invention. This embodiment is described by using an example in which a first base station is an eNB1 and a second communications node is an eNB2, and is described by using an example in which the eNB1 and the eNB2 perform downlink data transmission.

Referring to FIG. 5A, a first PDCP entity of the eNB1 performs data splitting and sequence number (SN) processing (for example, numbering) on received service data corresponding to an EPS bearer, to obtain first data and second data. Then, the first PDCP entity performs a buffer function, a header compression function, a security function (for example, an encryption and/or integrity protection function), and a PDCP header adding function on the first data, and transfers the first data to a third PDCP entity of user equipment by using an RLC layer, a MAC layer, and a PHY layer of the eNB1 and a PHY layer, a MAC layer, and an RLC layer of the user equipment. Meanwhile, the first PDCP entity performs the header compression function, the security processing function, and the PDCP header adding function on the second data, and sends the second data to which a PDCP header is added to the eNB2 by using a third bearer. A second PDCP entity of the eNB2 performs buffer processing on the second data, and transfers the second data to a fourth PDCP entity of the user equipment by using an L1/L2 layer of the eNB2 and an L1/L2 layer of the user equipment. The fourth entity buffers the second data, and transfers the buffered second data to the third PDCP entity of the user equipment. The third PDCP entity performs a PDCP header removal function, a buffer function, a security processing function, and a header decompression function on the second data, and the third PDCP entity performs sequence number processing (for example, reordering) on all the service data. Finally, the third PDCP entity reorders all the first data and the second data and transfers them to an upper layer of the third PDCP entity.

Optionally, that the third PDCP entity performs sequence number processing (for example, reordering) on the second data may also be optional, that is, the data may be directly forwarded to the fourth PDCP entity, and the fourth PDCP entity reorders all the first data and the second data.

Figure 5B:
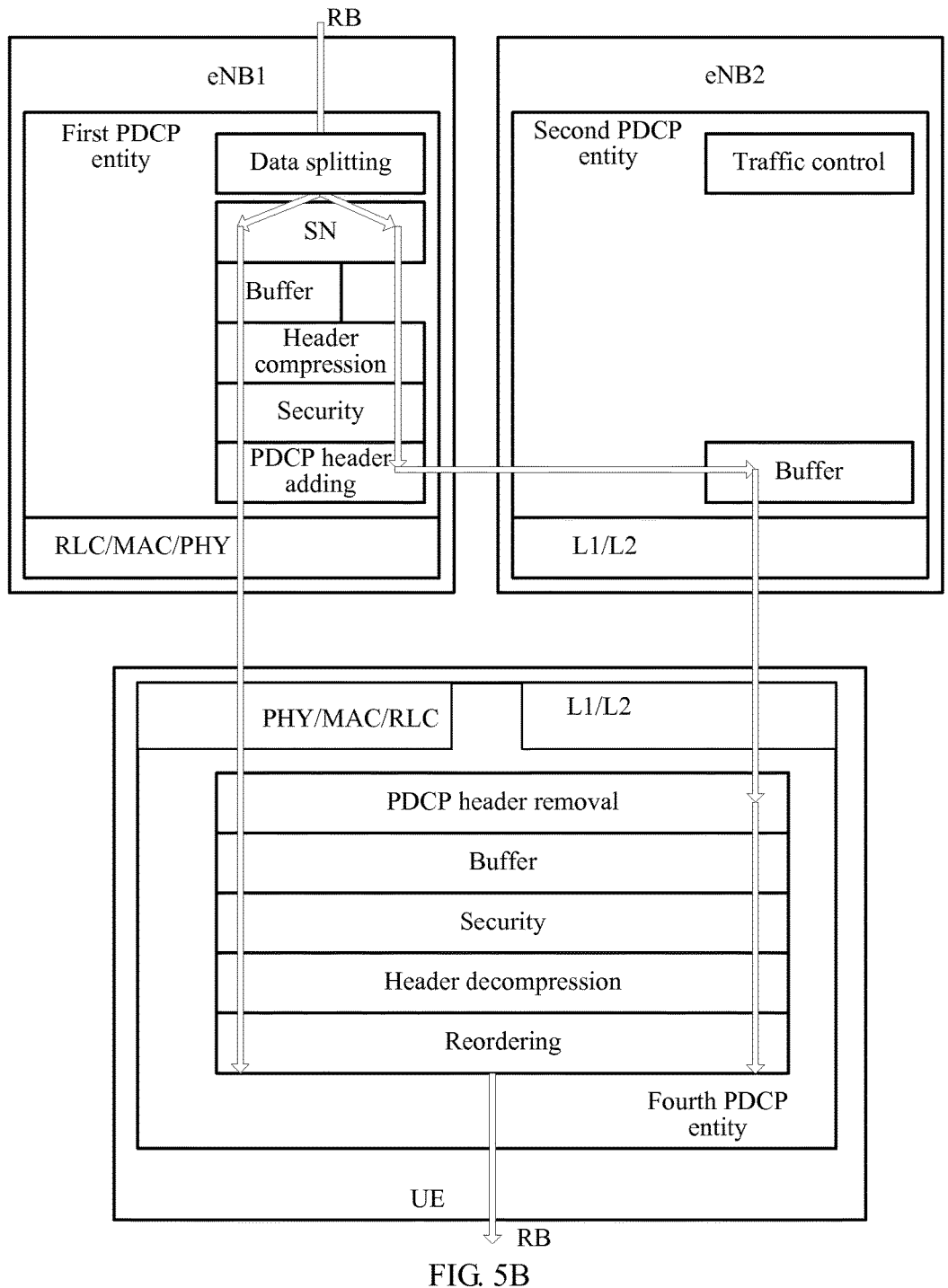
FIG. 5B is a schematic diagram of a cooperative relationship between PDCP entities according to another embodiment of the present invention.

FIG. 5B is a schematic diagram of a cooperative relationship between PDCP entities according to another embodiment of the present invention. This embodiment is described by using an example in which a first base station is an eNB1 and a second communications node is an eNB2. A first PDCP entity and a second PDCP entity in the embodiment in FIG. 5B are similar to the first PDCP entity and the second PDCP entity in FIG. 4C, which are not described herein again. Different from the embodiment in FIG. 5A, in the embodiment in FIG. 5B, a first radio bearer between user equipment and the eNB1 corresponds to a fourth PDCP entity and the first PDCP entity, a second radio bearer between the user equipment and the eNB2 corresponds to the fourth PDCP entity and the second PDCP entity. The fourth PDCP entity performs a PDCP header removal function, a buffer function, a security processing function, and a header decompression function on first data and second data, and performs sequence number processing (for example, reordering) on all service data.

Figure 5C:
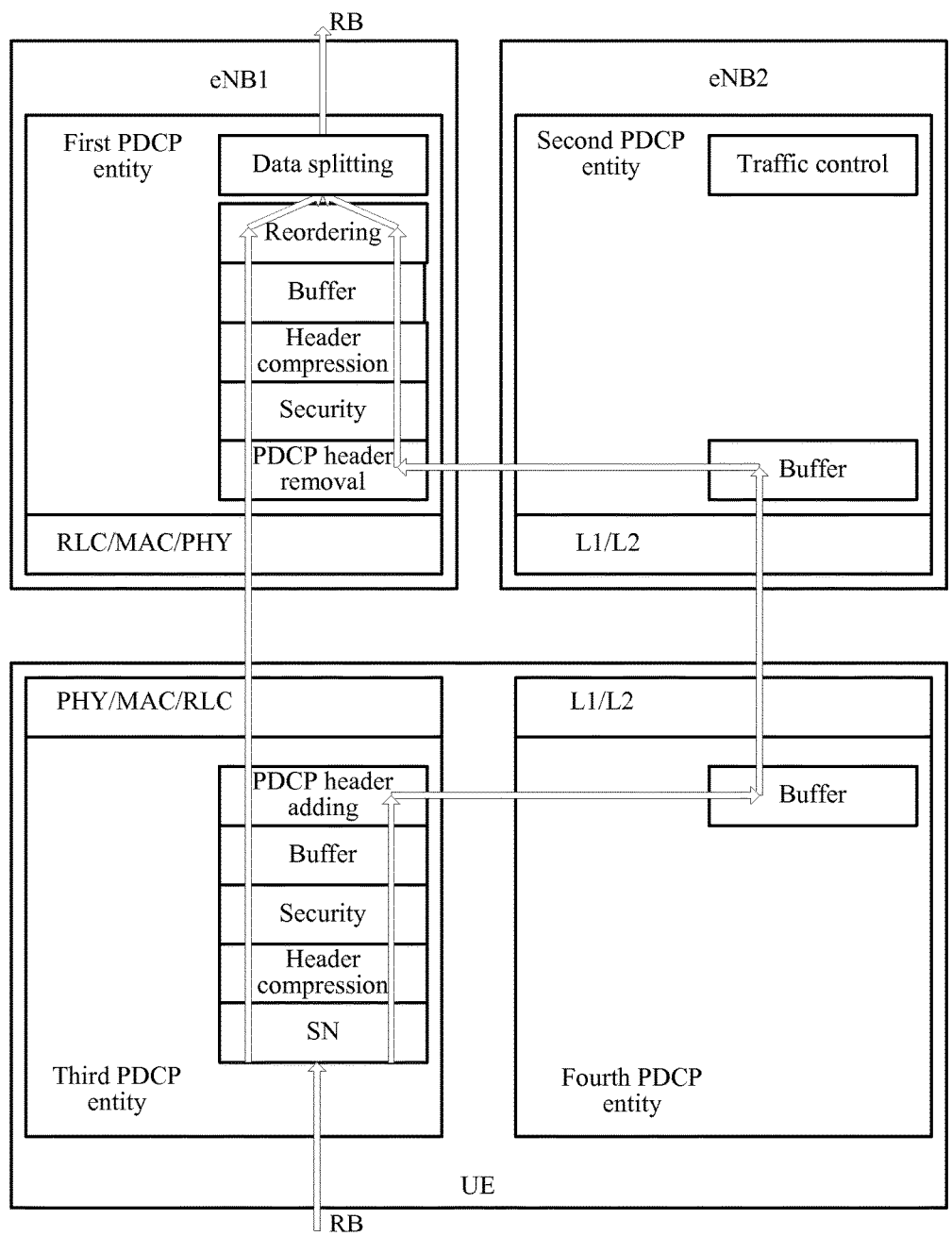
FIG. 5C is a schematic diagram of a cooperative relationship between PDCP entities according to an embodiment of the present invention.

FIG. 5C is a schematic diagram of a cooperative relationship between PDCP entities according to an embodiment of the present invention. This embodiment is described by using an example in which the first base station is an eNB1 and the second communications node is an eNB2, and is described by using an example in which the eNB1 and the eNB2 perform uplink data transmission.

Referring to FIG. 5C, a third PDCP entity of user equipment performs splitting and sequence number (SN) processing (for example, numbering) on uplink service data to obtain first data and second data. Then, the third PDCP entity performs a header compression function, a security function (for example, an encryption and/or integrity protection function), a buffer function, and a PDCP header adding function on the first data, and transfers the first data to a first PDCP entity of the eNB1 by using a PHY/RLC/MAC layer of the user equipment and a MAC/RLC/PHY layer of the first base station. Meanwhile, the third PDCP entity performs the header compression function, the security processing function, and the PDCP header adding function on the second data, and transfers the second data to which a PDCP header is added to a fourth PDCP entity. The fourth PDCP entity transfers the second data to a second PDCP entity by using an L1/L2 layer of the user equipment and an L1/L2 layer of the eNB2, and the second PDCP entity performs buffer processing on the second data, and transfers the second data to the first PDCP entity of the base station by using a third bearer. The first PDCP entity performs a PDCP header removal function, a security processing function, and a header decompression function on the second data, and performs, in a buffer of the first PDCP entity, sequence number processing (for example, reordering) on the first data and the second data to obtain the service data. Finally, the first PDCP entity transfers reordered service data to an upper layer of the first PDCP entity.

Figure 5D:
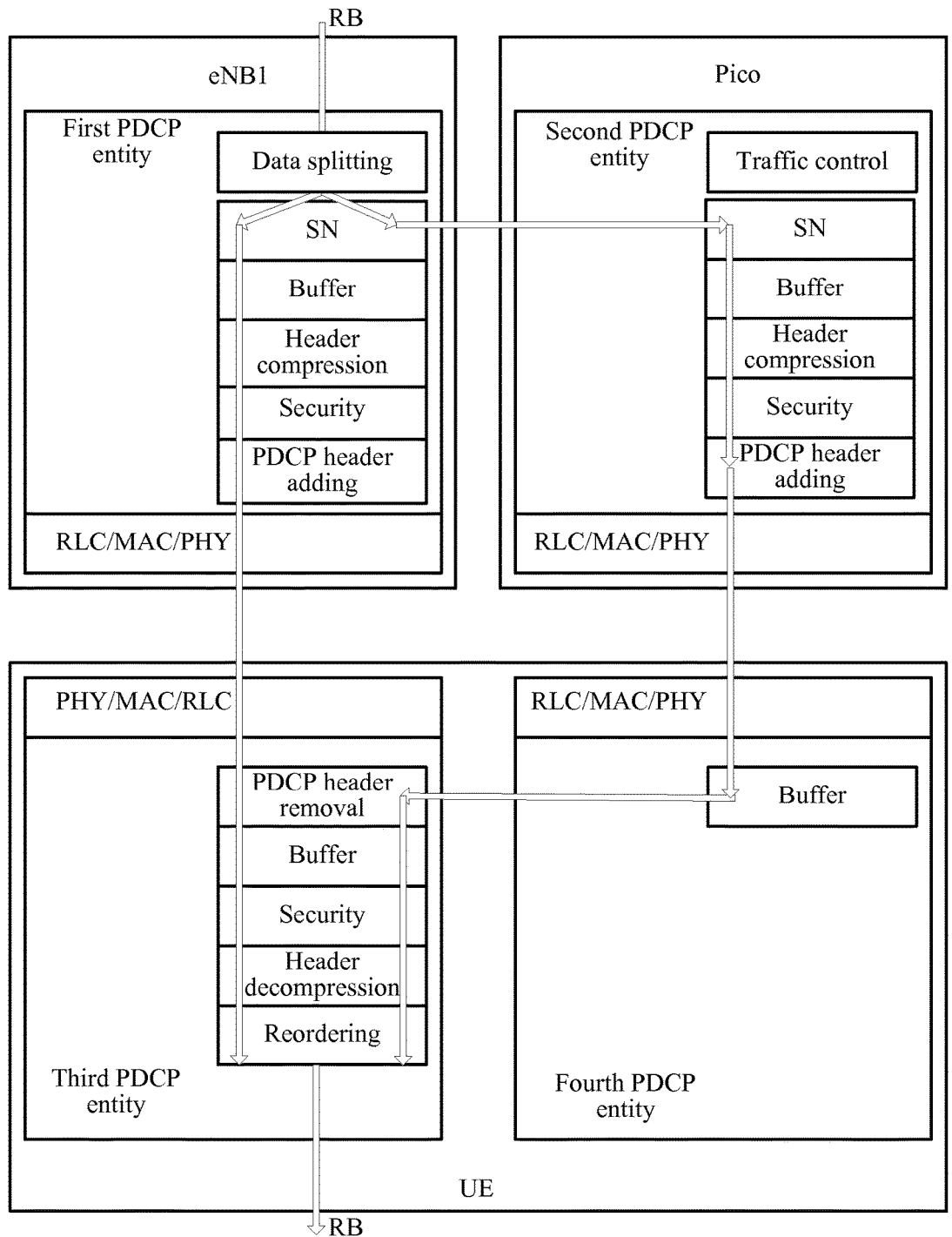
FIG. 5D is a schematic diagram of a cooperative relationship between PDCP entities according to another embodiment of the present invention.

FIG. 5D is a schematic diagram of a cooperative relationship between PDCP entities according to another embodiment of the present invention. This embodiment is described by using an example in which a first base station is an eNB1 and a second communications node is a Pico base station. A first PDCP entity of the eNB1 performs data splitting and sequence number (SN) processing (for example, numbering) on received service data corresponding to an EPS bearer, to obtain first data and second data. Then, the first PDCP entity performs a buffer function, a header compression function, a security function (for example, an encryption and/or integrity protection function), and a PDCP header adding function on the first data, and transfers the first data to a third PDCP entity of user equipment by using an RLC layer, a MAC layer, and a PHY layer of the eNB1 and a PHY layer, a MAC layer, and an RLC layer of the user equipment. Meanwhile, the first PDCP entity transmits the second data that undergoes sequence number processing to the eNB2 by using a bearer between base stations, and a second PDCP entity performs a header compression function, sequence number processing (optional), a security processing function, and a PDCP header adding function on the second data, and transfers the second data to which a PDCP header is added to a fourth PDCP entity of the user equipment by using an L1/L2 layer of the eNB2 and an L1/L2 layer of the user equipment. The fourth entity buffers the second data, and transfers the buffered second data to the third PDCP entity of the user equipment. The third PDCP entity performs a PDCP header removal function, a buffer function, a security processing function, and a header decompression function on the second data, and the third PDCP entity performs sequence number processing (for example, reordering) on all the service data. Finally, the third PDCP entity reorders all the first data and the second data and transfers them to an upper layer of the third PDCP entity.

Figure 5E:
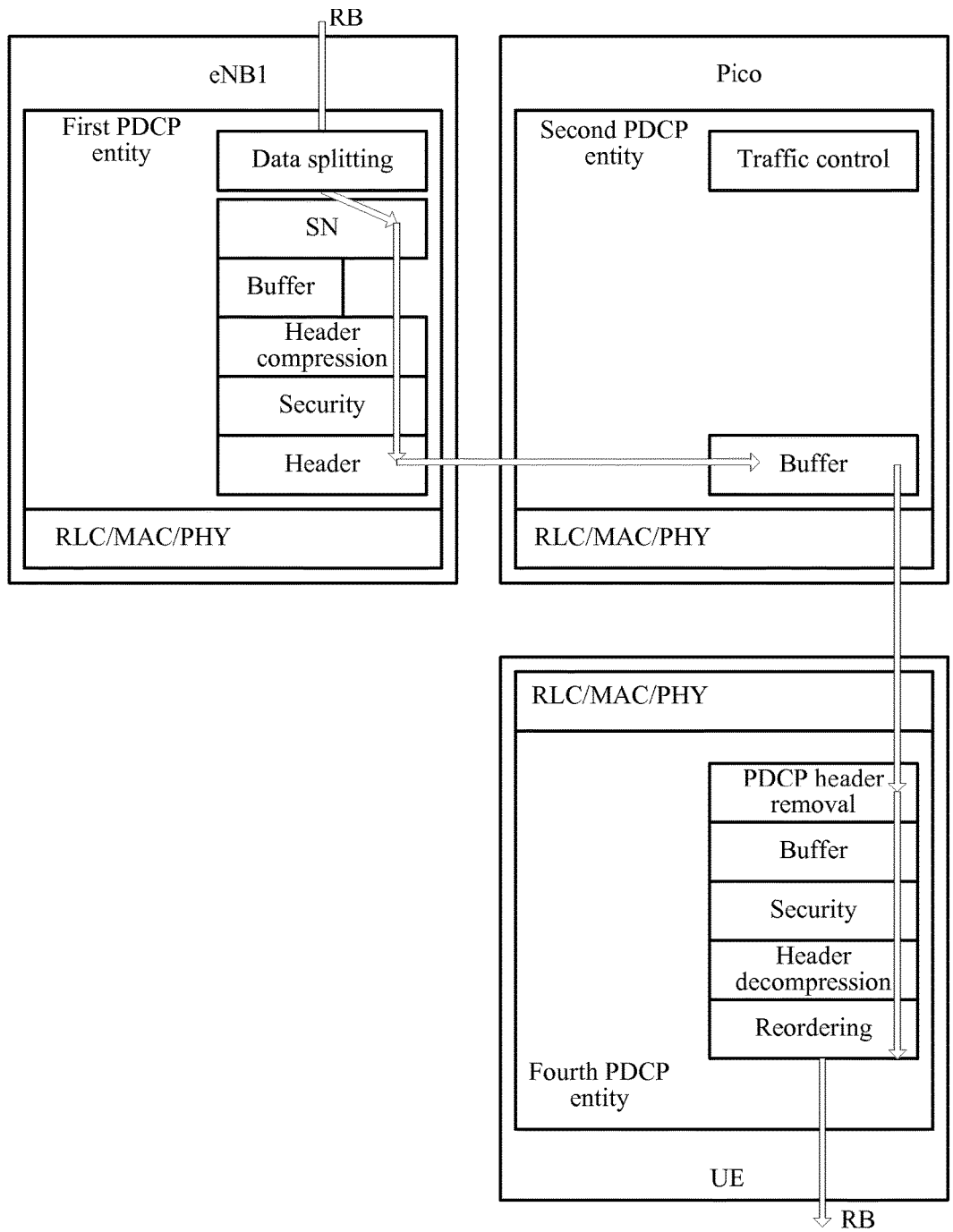
FIG. 5E is a schematic diagram of a cooperative relationship between PDCP entities according to still another embodiment of the present invention.

FIG. 5E is a schematic diagram of a cooperative relationship between PDCP entities according to still another embodiment of the present invention. This embodiment is described by using an example in which a first base station is an eNB1 and a second communications node is a Pico base station.

Referring to FIG. 5E, the eNB1 may not perform splitting on received service data corresponding to an EPS bearer, but perform a header compression function, a security processing function, and a PDCP header adding function on all the service data after performing, in the first PDCP entity, numbering processing on the service data, and transmit all the service data to a second PDCP entity by using a third bearer. The second PDCP entity transfers, after performing buffer processing on all the service data, all the service data to a fourth PDCP entity by using an RLC layer, a MAC layer, and a PHY layer of the second PDCP entity and a PHY layer, a MAC layer, and an RLC layer of the Pico base station. The fourth PDCP entity performs a PDCP header removal function, a sequence number processing function, a header decompression function, a security processing function, and a buffer function on all the service data, and reorders, in a buffer of the fourth PDCP entity, all the service data. Finally, the fourth PDCP entity transfers reordered service data to an upper layer of the fourth PDCP entity.

Figure 5F:
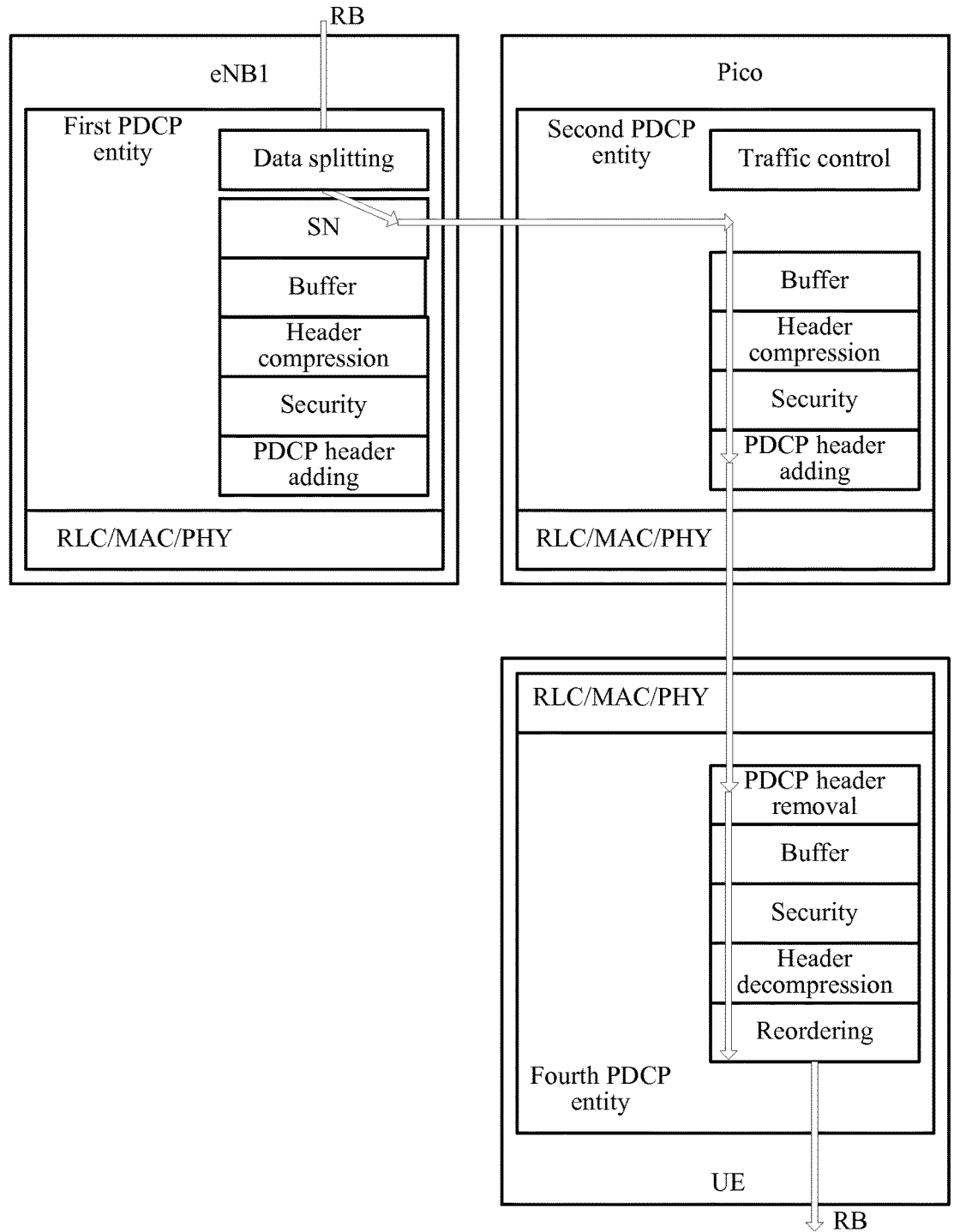
FIG. 5F is a schematic diagram of a cooperative relationship between PDCP entities according to yet another embodiment of the present invention.

FIG. 5F is a schematic diagram of a cooperative relationship between PDCP entities according to yet another embodiment of the present invention. This embodiment is described by using an example in which a first base station is an eNB1 and a second communications node is a Pico base station.

Referring to FIG. 5F, the eNB1 may not perform splitting on received service data corresponding to an EPS bearer, but transfer, after performing, in a first PDCP entity, numbering processing on the service data, all the service data to the Pico base station by using a third bearer. The second PDCP entity of the Pico base station performs a buffer function, a header compression function, a security processing function, and a PDCP header adding function on all the service data, and transfers all the data to a fourth PDCP entity by using an RLC layer, a MAC layer, and a PHY layer of the second PDCP entity and a PHY layer, a MAC layer, and an RLC layer of the Pico base station. The fourth PDCP entity performs a PDCP header removal function, an SN function, a header decompression function, a security processing function, and a buffer function on all the service data, and reorders, in a buffer, all the service data. Finally, the fourth PDCP entity transfers reordered service data to an upper layer of the fourth PDCP entity.

It should be understood that, although the embodiments in FIG. 5B, FIG. 5D, and FIG. 5E are described by using an example in which the first base station and the user equipment perform downlink data transmission, a person skilled in the art should understand that a process of uplink data transmission and a process of downlink data transmission are mutually inverse. Therefore, a cooperative relationship between PDCP entities in the process of uplink data transmission is similar to the cooperative relationship between PDCP entities in the process of downlink data transmission, which is not described herein again.

Figure 5G:
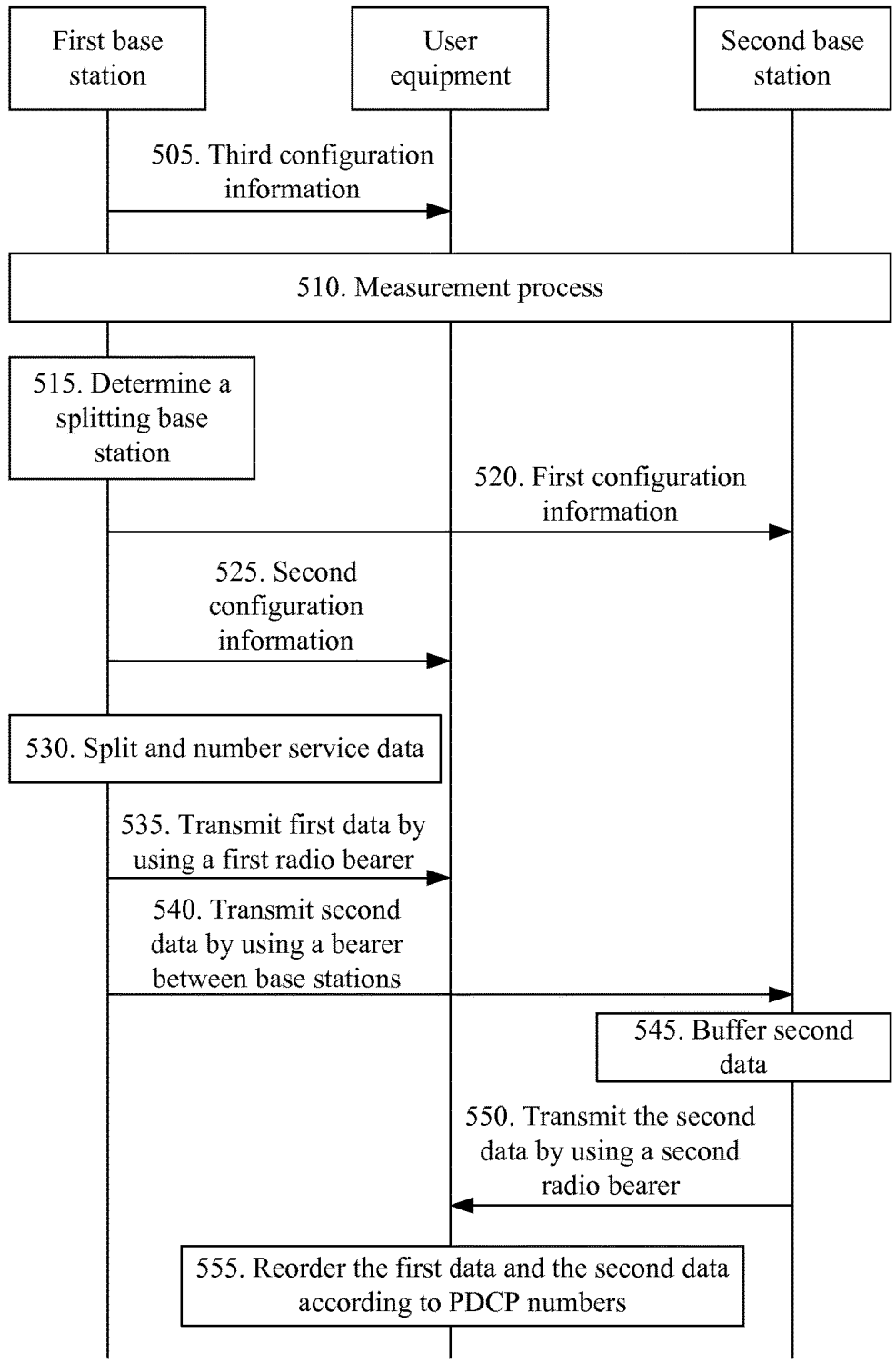
FIG. 5G is a schematic flowchart of a data transmission process according to an embodiment of the present invention.

FIG. 5G is a schematic flowchart of a data transmission process according to an embodiment of the present invention. This embodiment of the present invention is described by using an example of downlink data transmission.

505. A first base station sends third configuration information to user equipment, so as to establish a first radio bearer with the user equipment.

For example, the first base station establishes an L1 layer protocol entity and an L2 layer protocol entity according to configuration information delivered by a higher layer, where the L2 protocol entity of the first base station includes a first PDCP entity, and sends the third PDCP configuration information to the user equipment by using RRC signaling, to configure an L1 layer protocol entity and an L2 layer protocol entity of the user equipment, where the L2 layer protocol entity of the user equipment includes a third PDCP entity, so that the first base station establishes the first radio bearer corresponding to the first PDCP entity and the third PDCP entity with the user equipment.

510. The user equipment performs signal measurement, and then directly or indirectly reports a measurement result of a second base station to the first base station.

Signal measurement performed by the user equipment is similar to conventional cell measurement, which is not described herein again.

515. The first base station determines, according to the measurement result, to use the second base station as a splitting base station.

The first base station determines, according to the measurement result, that a second radio bearer may be established between the second base station and the user equipment, so as to perform data splitting. An association (mapping) relationship is set between the first radio bearer and the second radio bearer, so that the first radio bearer and the second radio bearer jointly transmit service data from one EPS bearer for the UE.

520. The first base station sends first configuration information to the second base station.

For example, the first base station sends the first configuration information to the second base station by using signaling of an application layer protocol between base stations. The first configuration information is used to configure an L1/L2 protocol entity of the second base station. The first configuration information includes configuration information of a second PDCP entity. Specifically, the first configuration information may include a function enabling/disabling indication for the second PDCP entity, which is used to indicate whether a function in the second PDCP entity is applied. Functions in the second PDCP entity may include at least one of the following functions: a numbering function, a header compression (for example, Robust Header Compression, ROHC) function, a security function, a header processing function, and a buffer function. The first configuration information may further carry configuration information used to establish an inter-base station bearer between the first base station and the second base station and information used to indicate an association relationship between the first radio bearer and a third radio bearer.

525. A first base station sends second configuration information to the user equipment, so as to establish a second radio bearer between the second base station and the user equipment.

The second configuration information is used to configure an L1 layer protocol entity and an L2 layer protocol entity of the user equipment, where the L2 layer protocol entity includes a fourth PDCP entity. Specifically, the second configuration information may further include a function enabling/disabling indication for the third PDCP entity and the fourth PDCP entity, which is used to indicate whether a function in the PDCP entities is applied. The second configuration information may further include an association relationship between the first radio bearer and the second radio bearer, so that the user equipment performs, in the PDCP entities, joint processing on data from the first radio bearer and the second radio bearer.

530. After the second radio bearer between the user equipment and the second base station is successfully established, the first base station may split downlink data by using a splitting algorithm, and number the downlink data.

Specifically, splitting is performed in the first PDCP entity of the first base station, and the splitting algorithm is a traffic control mechanism, and may be based on a buffer status of a PDCP entity of the corresponding second base station. To control that data in a data packet split to the second base station is proper, a traffic control method is introduced between the first base station and the second base station, where the method includes: feeding back, by the second base station, an occupation condition of a buffer of the second PDCP entity to the first base station.

Specifically, the data split to the second base station needs to be numbered at a PDCP layer of the first base station at a minimum, and another PDCP layer function or operation is optional. A function or operation of storing a data packet received from the first base station at a PDCP layer of the second base station is mandatory, and another PDCP layer function or operation is optional. For an optional PDCP layer function, the first base station and the second base station are usually mutually exclusive, that is, when the first base station performs a function, the second base station does not need to perform the function again. Alternatively, if the second base station ignores a function that has been performed by the first base station, the second base station performs an operation for the function again. For PDCP layer functions, as shown in FIG. 5A to FIG. 5F, there are several options in specific function division for the first base station and the second base station. Specific processing of a PDCP entity may be determined according to a previous configuration (for example, the foregoing configuration information).

535. The first base station uses the first radio bearer to transmit split first data to the user equipment.

540. The first base station uses a third bearer to transmit split second data to the second base station.

For example, after the first base station delivers data from an EPS bearer of the user equipment to a corresponding PDCP entity, one part of the data is transmitted to the UE by using the first radio bearer, and the other part of the data is transmitted to the second base station by using the third bearer after being numbered in a PDCP entity of the first base station.

More specifically, after the first base station forwards the data to the second base station, a buffer on the PDCP entity of the first base station no longer includes the data packet, but the data packet is directly discarded/released.

545. The second base station stores the split second data received in a buffer of the second PDCP entity.

Optionally, in addition to store the second data in the second PDCP entity, the second base station may further perform functions such as header compression, security processing, and/or PDCP header adding on the second data according to the second configuration information.

550. The second base station uses the second radio bearer to transmit the second data to the user equipment.

For example, the second base station delivers the second data in the buffer to the user equipment.

555. The user equipment reorders the first data and the second data according to PDCP numbers.

The user equipment reorders the data received from the first base station and the data received from the second base station, and submits them to an upper layer. For example, the user equipment may reorder, in the third PDCP entity, the received service data according to numbers allocated by the PDCP entity of the first base station to the service data.

It should be understood that the foregoing configuration information may further include configuration information of other protocol entities (for example, a MAC entity and an RLC entity), except the PDCP entities, at the L1 layer and the L2 layer, and the configuration information and an establishment process of the other protocol entities except the PDCP entities are similar to the conventional configuration information and establishment process of the protocol entities at the L1 layer and the L2 layer, which are not described herein again.

Figure 6:
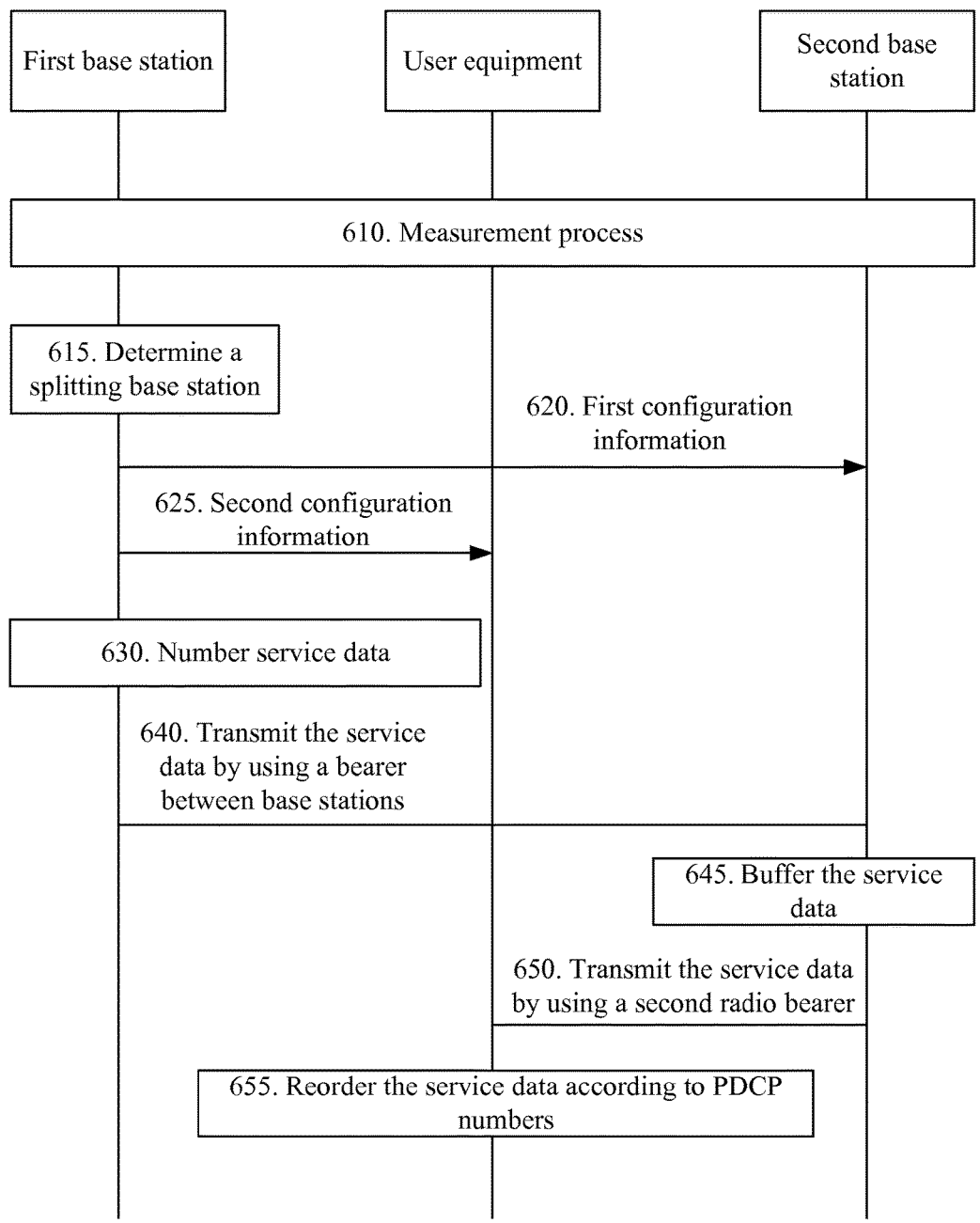
FIG. 6 is a schematic flowchart of a data transmission process according to an embodiment of the present invention.

FIG. 6 is a schematic flowchart of a data transmission process according to an embodiment of the present invention. Steps 610, 615, 620, and 625 in FIG. 6 are similar to steps 510, 515, 520, and 525 in FIG. 5. Details are not described herein again.

610. User equipment performs signal measurement, and then directly or indirectly reports a measurement result of a second base station to a first base station.

615. The first base station determines, according to the measurement result, to use the second base station as a splitting base station.

620. The first base station sends first configuration information to the second base station.

625. A first base station sends second configuration information to the user equipment, so as to establish a second radio bearer between the second base station and the user equipment. The first configuration information may further carry configuration information used to establish an inter-base station bearer between the first base station and the second base station and information used to indicate an association relationship between a first radio bearer and a third radio bearer.

630. After the second radio bearer between the user equipment and the second base station is successfully established, the first base station may number downlink data.

Specifically, all service data needs to be numbered at a PDCP layer of the first base station at a minimum, and another PDCP layer function or operation is optional. A function or operation of storing a data packet received from the first base station at a PDCP layer of the second base station is mandatory, and another PDCP layer function or operation is optional. However, for an optional PDCP layer function, the first base station and the second base station are usually mutually exclusive, that is, when the first base station performs a function, the second base station does not need to perform the function again. Alternatively, if the second base station ignores a function that has been performed by the first base station, the second base station performs an operation for the function again. For PDCP layer functions, as shown in FIG. 4C to FIG. 4F, there are several options in specific function division for the first base station and the second base station. Specific processing of a PDCP entity may be determined according to a previous configuration (for example, the foregoing configuration information).

640. The first base station uses a third bearer to transmit all service data to the second base station.

For example, after the first base station delivers data from an EPS bearer of the user equipment to a corresponding PDCP entity, all data packets are transmitted to the second base station by using the third bearer after being numbered in a PDCP entity of the first base station.

More specifically, after the first base station forwards all the service data to the second base station, a buffer on the PDCP entity of the first base station no longer includes the data packet, but the data packet is directly discarded/released.

645. The second base station stores the received service data in a buffer of the second PDCP entity.

Optionally, in addition to store the service data in the second PDCP entity, the second base station may further perform functions such as header compression, security processing, and/or PDCP header adding on the service data according to the second configuration information.

650. The second base station uses the second radio bearer to transmit the service data to the user equipment.

For example, the second base station delivers the service data in the buffer to the user equipment.

655. The user equipment reorders the service data according to PDCP numbers.

After processing the received data, a fourth PDCP entity of the user equipment forwards the data to a third PDCP entity corresponding to the first radio bearer that is associated with the second radio bearer corresponding to the fourth PDCP entity for processing.

The user equipment reorders the service data and submits the service data to an upper layer. For example, the user equipment may reorder, in the third PDCP entity, the received service data according to numbers allocated by the PDCP entity of the first base station to the service data.

The foregoing describes a data transmission method according to the embodiments of the present invention. The following describes a base station, a communications node, and user equipment according to the embodiments of the present invention with reference to FIG. 7 to FIG. 12 separately.

Figure 7:
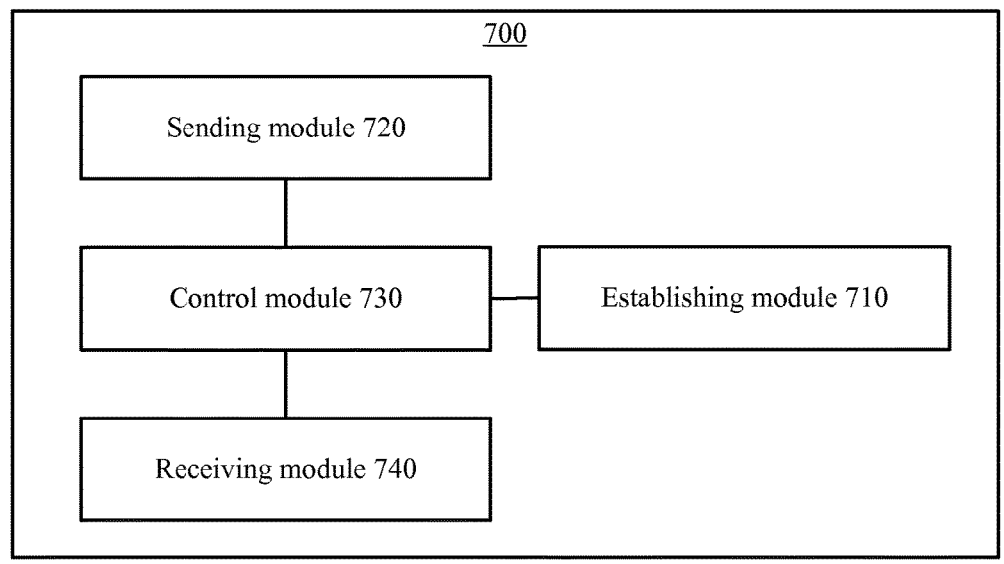
FIG. 7 is a schematic structural diagram of a base station according to an embodiment of the present invention.

FIG. 7 is a schematic structural diagram of a base station 700 according to an embodiment of the present invention. The base station 700 includes: an establishing module 710, a sending module 720, a control module 730, and a receiving module 740.

The establishing module 710 establishes a first Packet Data Convergence Protocol PDCP entity. The sending module 720 sends first configuration information to a second communications node, and sends second configuration information to user equipment, so as to establish a second radio bearer between the second communications node and the user equipment, where the first configuration information includes configuration information of a second PDCP entity of the second communications node, the second configuration information includes configuration information of a fourth PDCP entity of the user equipment, and the second radio bearer corresponds to the second PDCP entity and the fourth PDCP entity; and sends fourth configuration information to the second communications node, so as to establish a third bearer between a first base station and the second communications node, and sends an association relationship between the second radio bearer and the third bearer to the second communications node, where the association relationship is used to associate the second radio bearer with the third bearer. The control module 730 uses the third bearer and the second radio bearer to transmit, by using the receiving module and the sending module, at least a part of data of service data between the first base station and the user equipment, where a first PDCP entity established by the establishing module and the second PDCP entity of the second communications node perform joint processing on the at least a part of data, and the control module performs, in the first PDCP entity, a sequence number processing function on the service data.

According to this embodiment of the present invention, a first base station may use a third bearer between the first base station and a second communications node and a second radio bearer between the second communications node and user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the configuration information of the second PDCP entity that is sent by the sending module includes information that instructs the second PDCP entity to perform a buffer function on the at least a part of data.

According to this embodiment of the present invention, the configuration information of the second PDCP entity that is sent by the sending module further includes information that instructs the second PDCP entity to perform one part of functions of a header compression processing function, a security processing function, and a PDCP header processing function on the at least a part of data that undergoes sequence number processing, where in a process of transmitting the at least a part of data, the control module 730 further performs, in the first PDCP entity, the other part of functions, except the one part of functions, of the header compression processing function, the security processing function, and the PDCP header processing function on the at least a part of data; or the configuration information of the second PDCP entity further includes information that instructs the second PDCP entity to perform a header compression processing function, a security processing function, and a PDCP header processing function on the at least a part of data.

According to this embodiment of the present invention, the configuration information of the fourth PDCP entity further includes information that instructs the fourth PDCP entity to perform the header compression processing function, the security processing function, the PDCP header processing function, and the sequence number processing function on the at least a part of data.

According to this embodiment of the present invention, in a process of transmitting the at least a part of data, the control module further performs the header compression processing function, the security processing function, and the PDCP header processing function on the at least a part of data.

According to this embodiment of the present invention, the control module discards the at least a part of data after transmitting the at least a part of data to the second PDCP entity; or the control module starts a timer after transmitting the at least a part of data to the second PDCP entity, and discards the at least a part of data after the timer expires.

According to this embodiment of the present invention, the service data includes first data and second data, and the second data is the at least a part of data; the sending module further sends third configuration information to the user equipment, so as to establish a first radio bearer between the first base station and the user equipment, where the third configuration information includes configuration information of a third PDCP entity of the user equipment, and the first radio bearer corresponds to the first PDCP entity and the third PDCP entity; and the control module further uses the first radio bearer to transmit the first data of the service data between the first base station and the user equipment.

Optionally, in another embodiment, the configuration information of the third PDCP entity that is sent by the sending module includes information that instructs the third PDCP entity to perform one part of functions of the header compression processing function, the security processing function, and the PDCP header processing function on the second data, and the configuration information of the fourth PDCP entity further includes information that instructs the fourth PDCP entity to perform the other part of functions, except the one part of functions, of the header compression processing function, the security processing function, and the PDCP header processing function on the second data.

Optionally, in another embodiment, the service data includes first data and second data, and the second data is the at least a part of data; the establishing module further establishes a first radio bearer between the first base station and the user equipment according to the second configuration information, where the first radio bearer corresponds to the first PDCP entity and the fourth PDCP entity; and the control module further uses the first radio bearer to transmit the first data of the service data between the first base station and the user equipment.

According to this embodiment of the present invention, the base station in FIG. 7 further includes the receiving module 740. The receiving module 740 further receives traffic status information sent by the second communications node; and the control module performs, in the first PDCP entity, traffic control on the at least a part of data according to the traffic status information received by the receiving module, where the traffic status information includes a buffer status indication, which is used to indicate a status for occupying a buffer of the second PDCP entity by the at least a part of data, and/or the traffic status information includes a traffic control indication, which is used to indicate a variation or maintenance of traffic of the at least a part of data.

Optionally, in another embodiment, the sending module 720 further sends an association indication parameter to the user equipment and/or the second communications node, where the association indication parameter is used to associate the first radio bearer with the second radio bearer.

According to this embodiment of the present invention, the control module 730 uses the third bearer and the second radio bearer to transmit all data of the service data between the first base station and the user equipment.

According to this embodiment of the present invention, the first configuration information further includes a first preset time, so that the second PDCP entity discards the at least a part of data after the first preset time expires.

Optionally, in another embodiment, the second configuration information or the third configuration information further includes a second preset time and/or a waiting window, so that the user equipment reorders the service data according to the second preset time and/or the waiting window.

Optionally, in another embodiment, the configuration information of the second PDCP entity or the configuration information of the fourth PDCP entity further includes a function enabling/disabling indication, which is used to instruct a PDCP entity corresponding to the configuration to enable or disable at least one of the header compression processing function, the security processing function, and the PDCP header processing function.

Optionally, in another embodiment, the configuration information of the second PDCP entity or the configuration information of the fourth PDCP entity further includes a radio bearer type indication or a communications node type indication, which is used to instruct a PDCP entity corresponding to the configuration to perform at least one of the header compression processing function, the security processing function, and the PDCP header processing function according to the radio bearer type indication or the communications node type indication.

For operations and functions of the modules of the base station 700, reference may be made to the method in FIG. 2, and to avoid repetition, details are not described herein again.

Figure 8:
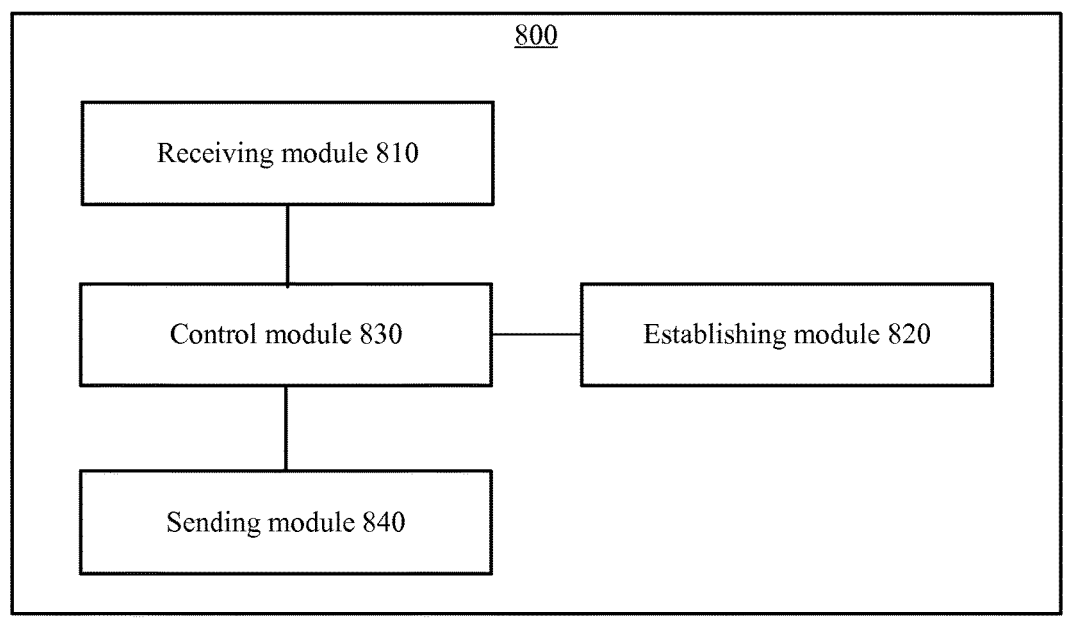
FIG. 8 is a schematic structural diagram of a communications node according to an embodiment of the present invention.

FIG. 8 is a schematic structural diagram of a communications node 800 according to an embodiment of the present invention. The communications node 800 includes: a receiving module 810, an establishing module 820, a control module 830, and a sending module 840.

The receiving module 810 receives first configuration information, fourth configuration information, and an association relationship between a second radio bearer and a third bearer that are sent by a first base station. The establishing module 820 establishes a second Packet Data Convergence Protocol PDCP entity according to the first configuration information received by the receiving module, and establishes the second radio bearer with user equipment, where the first configuration information includes configuration information of the second Packet Data Convergence Protocol PDCP entity, and the second radio bearer corresponds to the second PDCP entity and a fourth PDCP entity of the user equipment; and establishes the third bearer with the first base station according to the fourth configuration information received by the receiving module, and associates the second radio bearer with the third bearer according to the association relationship. The control module 830 is configured to use the third bearer and the second radio bearer that are established by the establishing module to transmit, by using the sending module and the receiving module, at least a part of data of service data between the first base station and the user equipment, where the second PDCP entity of the second communications node and a first PDCP entity of the first base station perform joint processing on the at least a part of data, and the first PDCP entity performs a sequence number processing function on the service data.

According to this embodiment of the present invention, a second communications node uses the third bearer and a second radio bearer to transmit at least a part of data of service data between a first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the configuration information of the second PDCP entity that is received by the receiving module includes information that instructs the second PDCP entity to perform a buffer function on the at least a part of data; the control module 830 performs the buffer function on the at least a part of data according to the configuration information of the second PDCP entity, so as to store the at least a part of data in a buffer of the communications node.

Optionally, in another embodiment, the control module 830 further discards the buffered at least a part of data after the second PDCP entity receives a delivery success indication sent by a lower-layer protocol entity of the second PDCP entity; or the control module 830 further discards the buffered at least a part of data after a preset time.

Optionally, in another embodiment, the configuration information of the second PDCP entity further includes information that instructs the second PDCP entity to perform at least a part of functions of a header compression processing function, a security processing function, and a PDCP header processing function on the at least a part of data, so that the control module 830 performs, in the second PDCP entity, the at least a part of functions of the header compression processing function, the security processing function, and the PDCP header processing function on the at least a part of data according to the configuration information of the second PDCP entity.

According to this embodiment of the present invention, the service data includes first data and second data, where the second data is the at least a part of data, and the first data is transmitted by using a first radio bearer between the first base station and the user equipment.

Optionally, in another embodiment, the communications node in FIG. 8 further includes: the sending module 840, configured to feed back traffic status information to the first base station, so that the first base station performs traffic control on the at least a part of data according to the traffic status information, where the traffic status information includes a buffer status indication, which is used to indicate a status for occupying a buffer of the second PDCP entity by the at least a part of data; and/or the traffic status information includes a traffic control indication, which is used to indicate a variation or maintenance of traffic of the at least a part of data.

Optionally, in another embodiment, the receiving module 810 further receives an association indication parameter sent by the first base station, where the association indication parameter is used to associate the first radio bearer with the second radio bearer.

According to this embodiment of the present invention, the control module 830 uses the second radio bearer to transmit all data of the service data between the first base station and the user equipment.

Optionally, in another embodiment, the configuration information of the second PDCP entity or configuration information of the fourth PDCP entity further includes a function enabling/disabling indication, which is used to instruct a PDCP entity corresponding to the configuration to enable or disable at least one of the compression processing function, the security processing function, and the PDCP header processing function; or the configuration information of the second PDCP entity or configuration information of the fourth PDCP entity further includes a radio bearer type indication, which is used to instruct a PDCP entity corresponding to the configuration to perform at least one of the header compression processing function, the security processing function, and the PDCP header processing function.

For operations and functions of the modules of the communications node 800, reference may be made to the method in FIG. 3, and to avoid repetition, details are not described herein again.

Figure 9:
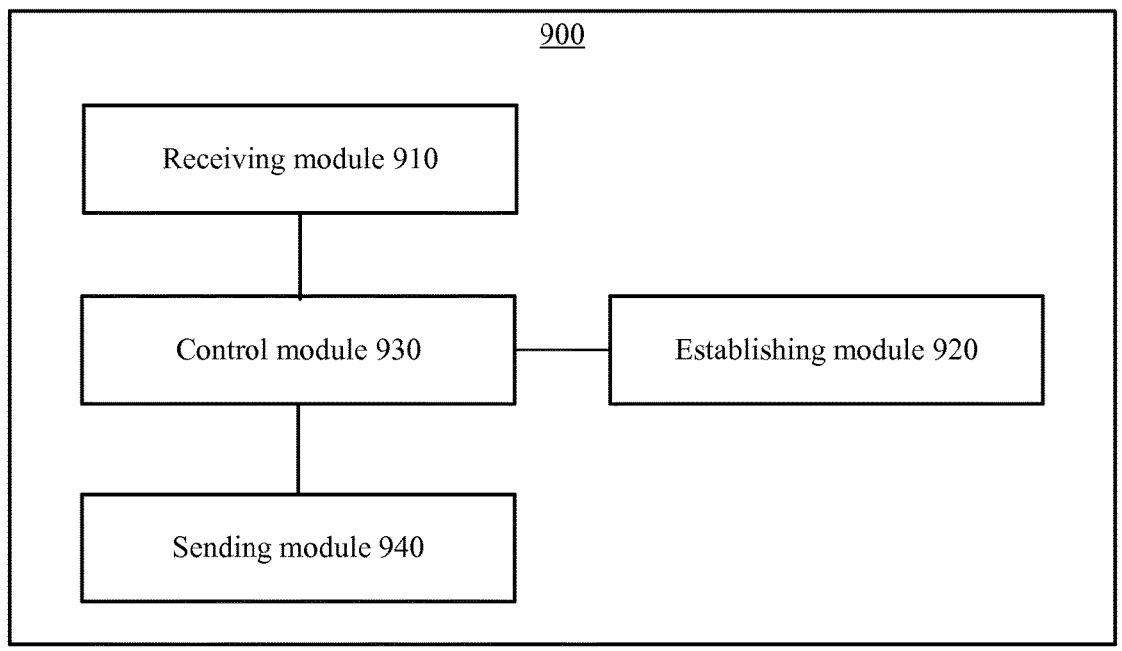
FIG. 9 is a schematic structural diagram of user equipment according to an embodiment of the present invention.

FIG. 9 is a schematic structural diagram of user equipment 900 according to an embodiment of the present invention. The user equipment 900 includes: a receiving module 910, an establishing module 920, a control module 930, and a sending module 940.

The receiving module 910 receives second configuration information sent by a first base station. The establishing module 920 is configured to establish a fourth PDCP entity according to the second configuration information received by the receiving module, and establish a second radio bearer between the user equipment and a second communications node, where the second configuration information includes configuration information of the fourth PDCP entity, and the second radio bearer corresponds to the fourth PDCP entity and a second PDCP entity of the second communications node. The control module 930 is configured to use the second radio bearer established by the establishing module to transmit, by using the sending module and the receiving module, at least a part of data of service data between the first base station and the user equipment, where in a process of transmitting the service data, a first PDCP entity of the first base station and the second PDCP entity of the second communications node perform joint processing on the at least a part of data, and the first PDCP entity performs a sequence number processing function on the service data.

According to this embodiment of the present invention, user equipment may use a third bearer between a first base station and a second communications node and a second radio bearer between the second communications node and the user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the service data includes first data and second data, and the second data is the at least a part of data; the receiving module 910 further receives third configuration information sent by the first base station, so that the user equipment establishes a third PDCP entity according to the third configuration information, and establishes a first radio bearer between the first base station and the user equipment, where the third configuration information includes configuration information of the third PDCP entity, and the first radio bearer corresponds to the first PDCP entity and the third PDCP entity; and the control module 930 further uses the first radio bearer to transmit the first data of the service data between the first base station and the user equipment, where when transmitting the service data, the control module 930 performs, in the third PDCP entity, the sequence number processing function on the service data.

According to this embodiment of the present invention, the configuration information of the fourth PDCP entity includes information that instructs the fourth PDCP entity to perform at least a part of functions of a header compression processing function, a security processing function, and a PDCP header processing function on the second data, so that the control module 930 performs, in the fourth PDCP entity, processing of one part of functions of the header compression processing function, the security processing function, and the PDCP header processing function on the second data according to the configuration information of the fourth entity, and performs, in the third PDCP entity, processing of the other part of functions, except the one part of functions, of the header compression processing function, the security processing function, and the PDCP header processing function on the second data according to the configuration information of the third PDCP entity.

According to this embodiment of the present invention, the service data includes first data and second data, and the second data is the at least a part of data; the establishing module 920 further establishes a first radio bearer between the first base station and the user equipment according to the second configuration information, where the first radio bearer corresponds to the first PDCP entity and the fourth PDCP entity; and the control module 930 further uses the first radio bearer to transmit the first data of the service data between the first base station and the user equipment, where when transmitting the service data, the control module 930 performs, in the fourth PDCP entity, the sequence number processing function on the service data.

According to this embodiment of the present invention, the configuration information of the fourth PDCP entity further includes information that instructs the fourth PDCP entity to perform a header compression processing function, a security processing function, a PDCP header processing function, and the sequence number processing function on the second data, so that the control module 930 performs, in the fourth PDCP entity, the header compression processing function, the security processing function, the PDCP header processing function, and the sequence number processing function on the second data according to the configuration information of the fourth PDCP entity.

Optionally, in another embodiment, the configuration information of the fourth PDCP entity further includes information that instructs the fourth PDCP entity to perform a buffer function on the at least a part of data; the control module further performs the buffer function on the at least a part of data according to the configuration information of the fourth PDCP entity, so as to store the at least a part of data in a buffer of the communications node.

Optionally, in another embodiment, the receiving module 910 further receives an association indication parameter sent by the first base station, where the association indication parameter is used to associate the first radio bearer with the second radio bearer, so that the control module performs, in the third PDCP entity and the fourth PDCP entity, joint processing on the at least a part of data according to the association indication parameter.

Optionally, in another embodiment, the control module 930 further uses the second radio bearer to transmit all data of the service data between the first base station and the user equipment.

Optionally, in another embodiment, the second configuration information or the third configuration information further includes a second preset time and/or a waiting window, so that the control module performs the sequence number processing function on the service data according to the second preset time and/or the waiting window.

Optionally, in another embodiment, the configuration information of the second PDCP entity or the configuration information of the fourth PDCP entity further includes a function enabling/disabling indication, which is used to instruct a PDCP entity corresponding to the configuration to enable or disable at least one of the header compression processing function, the security processing function, and the PDCP header processing function; or the configuration information of the second PDCP entity or the configuration information of the fourth PDCP entity further includes a radio bearer type indication, which is used to instruct a PDCP entity corresponding to the configuration to use at least one of the header compression processing function, the security processing function, and the PDCP header processing function.

For operations and functions of the modules of the user equipment 900, reference may be made to the method in FIG. 4, and to avoid repetition, details are not described herein again.

Figure 10:
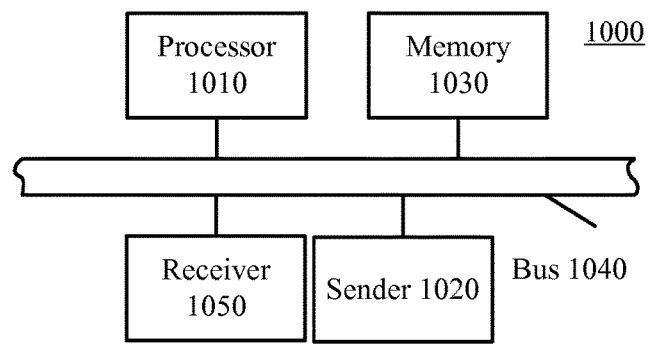
FIG. 10 is a schematic structural diagram of a base station according to an embodiment of the present invention.

FIG. 10 is a schematic structural diagram of a base station 1000 according to an embodiment of the present invention. The base station 1000 includes: a processor 1010, a sender 1020, a memory 1030, a receiver 1050, and a bus 1040.

The processor 1010 schedules code in the memory 1030 by using the bus 1040, so as to establish a first Packet Data Convergence Protocol PDCP entity. The sender 1020 sends first configuration information to a second communications node, and sends second configuration information to user equipment, so as to establish a second radio bearer between the second communications node and the user equipment, where the first configuration information includes configuration information of a second PDCP entity of the second communications node, the second configuration information includes configuration information of a fourth PDCP entity of the user equipment, and the second radio bearer corresponds to the second PDCP entity and the fourth PDCP entity; and sends fourth configuration information to the second communications node, so as to establish a third bearer between the first base station and the second communications node, and sends an association relationship between the second radio bearer and the third bearer to the second communications node, where the association relationship is used to associate the second radio bearer with the third bearer. The processor 1010 uses the third bearer and the second radio bearer to transmit, by using the receiver 1050 and the sender 1020, at least a part of data of service data between the first base station and the user equipment, where in a process in which the first base station transmits the service, the first PDCP entity of the first base station and the second PDCP entity of the second communications node perform joint processing on the at least a part of data, and the first PDCP entity performs a sequence number processing function on the service data.

According to this embodiment of the present invention, a first base station may use a third bearer between the first base station and a second communications node and a second radio bearer between the second communications node and user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the configuration information of the second PDCP entity that is sent by the sender 1020 includes information that instructs the second PDCP entity to perform a buffer function on the at least a part of data.

According to this embodiment of the present invention, the configuration information of the second PDCP entity that is sent by the sender 1020 further includes information that instructs the second PDCP entity to perform one part of functions of a header compression processing function, a security processing function, and a PDCP header processing function on the at least a part of data that undergoes sequence number processing, where in a process of transmitting the at least a part of data, the processor 1010 further performs the other part of functions, except the one part of functions, of the header compression processing function, the security processing function, and the PDCP header processing function on the at least a part of data; or the configuration information of the second PDCP entity further includes information that instructs the second PDCP entity to perform a header compression processing function, a security processing function, and a PDCP header processing function on the at least a part of data.

According to this embodiment of the present invention, the configuration information of the fourth PDCP entity further includes information that instructs the fourth PDCP entity to perform the header compression processing function, the security processing function, the PDCP header processing function, and the sequence number processing function on the at least a part of data.

According to this embodiment of the present invention, in a process of transmitting the at least a part of data, the processor 1010 further performs the header compression processing function, the security processing function, and the PDCP header processing function on the at least a part of data.

According to this embodiment of the present invention, the processor 1010 discards the at least a part of data after transmitting the at least a part of data to the second PDCP entity; or the processor 1010 starts a timer after transmitting the at least a part of data to the second PDCP entity, and discards the at least a part of data after the timer expires.

According to this embodiment of the present invention, the service data includes first data and second data, and the second data is the at least a part of data; the sender 1020 further sends third configuration information to the user equipment, so as to establish a first radio bearer between the first base station and the user equipment, where the third configuration information includes configuration information of a third PDCP entity of the user equipment, and the first radio bearer corresponds to the first PDCP entity and the third PDCP entity; and the processor 1010 further uses the first radio bearer to transmit the first data of the service data between the first base station and the user equipment.

Optionally, in another embodiment, the configuration information of the third PDCP entity that is sent by the sender 1020 includes information that instructs the third PDCP entity to perform one part of functions of the header compression processing function, the security processing function, and the PDCP header processing function on the second data, and the configuration information of the fourth PDCP entity further includes information that instructs the fourth PDCP entity to perform the other part of functions, except the one part of functions, of the header compression processing function, the security processing function, and the PDCP header processing function on the second data.

Optionally, in another embodiment, the service data includes first data and second data, and the second data is the at least a part of data; the processor 1010 further establishes a first radio bearer between the first base station and the user equipment according to the second configuration information, where the first radio bearer corresponds to the first PDCP entity and the fourth PDCP entity; and the processor 1010 further uses the first radio bearer to transmit the first data of the service data between the first base station and the user equipment.

According to this embodiment of the present invention, the receiver 1050 receives traffic status information sent by the second communications node; and the processor 1010 performs traffic control on the at least a part of data according to the traffic status information received by the receiver 1050, where the traffic status information includes a buffer status indication, which is used to indicate a status for occupying a buffer of the second PDCP entity by the at least a part of data, and/or the traffic status information includes a traffic control indication, which is used to indicate a variation or maintenance of traffic of the at least a part of data.

Optionally, in another embodiment, the sender 1020 further sends an association indication parameter to the user equipment and/or the second communications node, where the association indication parameter is used to associate the first radio bearer with the second radio bearer.

According to this embodiment of the present invention, the processor 1010 uses the third bearer and the second radio bearer to transmit all data of the service data between the first base station and the user equipment.

According to this embodiment of the present invention, the first configuration information further includes a first preset time, so that the second PDCP entity discards the at least a part of data after the first preset time expires.

Optionally, in another embodiment, the second configuration information or the third configuration information further includes a second preset time and/or a waiting window, so that the user equipment reorders the service data according to the second preset time and/or the waiting window.

Optionally, in another embodiment, the configuration information of the second PDCP entity or the configuration information of the fourth PDCP entity further includes a function enabling/disabling indication, which is used to instruct a PDCP entity corresponding to the configuration to enable or disable at least one of the header compression processing function, the security processing function, and the PDCP header processing function.

Optionally, in another embodiment, the configuration information of the second PDCP entity or the configuration information of the fourth PDCP entity further includes a radio bearer type indication or a communications node type indication, which is used to instruct a PDCP entity corresponding to the configuration to perform at least one of the header compression processing function, the security processing function, and the PDCP header processing function according to the radio bearer type indication or the communications node type indication.

For operations and functions of the modules of the base station 1000, reference may be made to the method in FIG. 2, and to avoid repetition, details are not described herein again.

Figure 11:
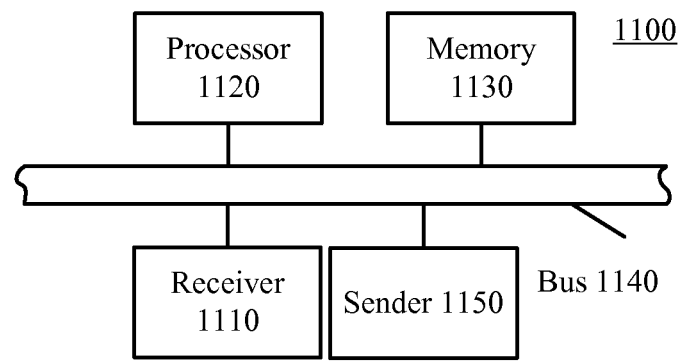
FIG. 11 is a schematic structural diagram of a communications node according to an embodiment of the present invention.

FIG. 11 is a schematic structural diagram of a communications node 1100 according to an embodiment of the present invention. The communications node 1100 includes: a receiver 1110, a processor 1120, a memory 1130, a sender 1150, and a bus 1140.

The receiver 1110 receives first configuration information, fourth configuration information, and an association relationship between a second radio bearer and a third bearer that are sent by a first base station. The processor 1120 schedules, by using the bus 1140, code stored in the memory 1130, so as to: establish a second Packet Data Convergence Protocol PDCP entity according to the first configuration information received by the receiver 1110, and establish a second radio bearer with user equipment, where the first configuration information includes configuration information of the second Packet Data Convergence Protocol PDCP entity, and the second radio bearer corresponds to the second PDCP entity and a fourth PDCP entity of the user equipment; establish a third bearer with a first base station according to the fourth configuration information, and associate the second radio bearer with the third bearer according to the association relationship; and use the third bearer and the second radio bearer to transmit, by using the sender 1150 and the receiver 1110, at least a part of data of service data between the first base station and the user equipment, where the second PDCP entity of the second communications node and a first PDCP entity of the first base station perform joint processing on the at least a part of data, and the first PDCP entity performs a sequence number processing function on the service data.

According to this embodiment of the present invention, a second communications node uses the third bearer and a second radio bearer to transmit at least a part of data of service data between a first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the configuration information of the second PDCP entity that is received by the receiver 1110 includes information that instructs the second PDCP entity to perform a buffer function on the at least a part of data; the processor 1120 performs the buffer function on the at least a part of data according to the configuration information of the second PDCP entity, so as to store the at least a part of data in a buffer of the communications node.

Optionally, in another embodiment, the processor 1120 further discards the buffered at least a part of data after receiving a delivery success indication sent by a lower-layer protocol entity of the second PDCP entity; or the processor 1120 further discards the buffered at least a part of data after a preset time.

Optionally, in another embodiment, the configuration information of the second PDCP entity further includes information that instructs the second PDCP entity to perform at least a part of functions of a header compression processing function, a security processing function, and a PDCP header processing function on the at least a part of data, so that the processor 1120 performs the at least a part of functions of the header compression processing function, the security processing function, and the PDCP header processing function on the at least a part of data according to the configuration information of the second PDCP entity.

According to this embodiment of the present invention, the service data includes first data and second data, where the second data is the at least a part of data, and the first data is transmitted by using a first radio bearer between the first base station and the user equipment.

Optionally, in another embodiment, the communications node in FIG. 11 further includes: the sender 1150, configured to feed back traffic status information to the first base station, so that the first base station performs traffic control on the at least a part of data according to the traffic status information, where the traffic status information includes a buffer status indication, which is used to indicate a status for occupying a buffer of the second PDCP entity by the at least a part of data; and/or the traffic status information includes a traffic control indication, which is used to indicate a variation or maintenance of traffic of the at least a part of data.

Optionally, in another embodiment, the receiver 1110 further receives an association indication parameter sent by the first base station, where the association indication parameter is used to associate the first radio bearer with the second radio bearer.

According to this embodiment of the present invention, the processor 1120 uses the second radio bearer to transmit all data of the service data between the first base station and the user equipment.

Optionally, in another embodiment, the configuration information of the second PDCP entity or configuration information of the fourth PDCP entity further includes a function enabling/disabling indication, which is used to instruct a PDCP entity corresponding to the configuration to enable or disable at least one of the compression processing function, the security processing function, and the PDCP header processing function; or the configuration information of the second PDCP entity or configuration information of the fourth PDCP entity further includes a radio bearer type indication, which is used to instruct a PDCP entity corresponding to the configuration to perform at least one of the header compression processing function, the security processing function, and the PDCP header processing function.

For operations and functions of the modules of the communications node 1100, reference may be made to the method in FIG. 3, and to avoid repetition, details are not described herein again.

Figure 12:
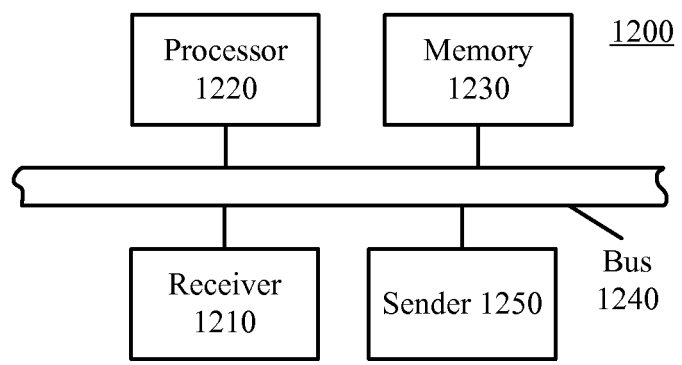
FIG. 12 is a schematic structural diagram of user equipment according to an embodiment of the present invention.

FIG. 12 is a schematic structural diagram of user equipment 1200 according to an embodiment of the present invention. The user equipment 1200 includes: a receiver 1210, a processor 1220, a memory 1230, a sender 1250, and a bus 1240.

The receiver 1210 receives second configuration information sent by a first base station. The processor 1220 schedules, by using the bus 1240, code stored in the memory 1230, so as to: establish a fourth PDCP entity according to the second configuration information received by the receiver 1210, and establish a second radio bearer between user equipment and a second communications node, where the second configuration information includes configuration information of the fourth PDCP entity, and the second radio bearer corresponds to the fourth PDCP entity and a second PDCP entity of the second communications node; and use the second radio bearer to transmit, by using the sender 1250 and the receiver 1210, at least a part of data of service data between the first base station and the user equipment, where a first PDCP entity of the first base station and the second PDCP entity of the second communications node perform joint processing on the at least a part of data, and the first PDCP entity performs a sequence number processing function on the service data.

According to this embodiment of the present invention, user equipment may use a third bearer between a first base station and a second communications node and a second radio bearer between the second communications node and the user equipment to transmit service data between the first base station and the user equipment; because the second radio bearer passes through an air interface between the user equipment and the second communications node, the user equipment can fully use radio resources of the second communications node for data transmission, so as to improve a throughput of the user equipment.

According to this embodiment of the present invention, the service data includes first data and second data, and the second data is the at least a part of data; the receiver 1210 further receives third configuration information sent by the first base station, so that the user equipment establishes a third PDCP entity according to the third configuration information, and establishes a first radio bearer between the first base station and the user equipment, where the third configuration information includes configuration information of the third PDCP entity, and the first radio bearer corresponds to the first PDCP entity and the third PDCP entity; and the processor 1220 further uses the first radio bearer to transmit the first data of the service data between the first base station and the user equipment, where when transmitting the service data, the processor 1220 performs the sequence number processing function on the service data.

According to this embodiment of the present invention, the configuration information of the fourth PDCP entity includes information that instructs the fourth PDCP entity to perform at least a part of functions of a header compression processing function, a security processing function, and a PDCP header processing function on the second data, so that the processor 1220 performs processing of one part of functions of the header compression processing function, the security processing function, and the PDCP header processing function on the second data according to the configuration information of the fourth entity, and performs processing of the other part of functions, except the one part of functions, of the header compression processing function, the security processing function, and the PDCP header processing function on the second data according to the configuration information of the third PDCP entity.

According to this embodiment of the present invention, the service data includes first data and second data, and the second data is the at least a part of data; the processor 1220 further establishes a first radio bearer between the first base station and the user equipment according to the second configuration information, where the first radio bearer corresponds to the first PDCP entity and the fourth PDCP entity; and the processor 1220 further uses the first radio bearer to transmit the first data of the service data between the first base station and the user equipment, where when transmitting the service data, the processor 1220 performs the sequence number processing function on the service data.

According to this embodiment of the present invention, the configuration information of the fourth PDCP entity further includes information that instructs the fourth PDCP entity to perform a header compression processing function, a security processing function, a PDCP header processing function, and the sequence number processing function on the second data, so that the processor 1220 performs the header compression processing function, the security processing function, the PDCP header processing function, and the sequence number processing function on the second data according to the configuration information of the fourth PDCP entity.

Optionally, in another embodiment, the configuration information of the fourth PDCP entity further includes information that instructs the fourth PDCP entity to perform a buffer function on the at least a part of data; the processor 1220 further performs the buffer function on the at least a part of data according to the configuration information of the fourth PDCP entity, so as to store the at least a part of data in a buffer of the communications node.

Optionally, in another embodiment, the receiver 1210 further receives an association indication parameter sent by the first base station, where the association indication parameter is used to associate the first radio bearer with the second radio bearer, so that the processor 1220 performs joint processing on the at least a part of data according to the association indication parameter.

Optionally, in another embodiment, the processor 1220 further uses the second radio bearer to transmit all data of the service data between the first base station and the user equipment.

Optionally, in another embodiment, the second configuration information or the third configuration information further includes a second preset time and/or a waiting window, so that the processor 1220 performs the sequence number processing function on the service data according to the second preset time and/or the waiting window.

Optionally, in another embodiment, the configuration information of the second PDCP entity or the configuration information of the fourth PDCP entity further includes a function enabling/disabling indication, which is used to instruct a PDCP entity corresponding to the configuration to enable or disable at least one of the header compression processing function, the security processing function, and the PDCP header processing function; or the configuration information of the second PDCP entity or the configuration information of the fourth PDCP entity further includes a radio bearer type indication, which is used to instruct a PDCP entity corresponding to the configuration to use at least one of the header compression processing function, the security processing function, and the PDCP header processing function.

For operations and functions of the modules of the user equipment 1200, reference may be made to the method in FIG. 4, and to avoid repetition, details are not described herein again.

An embodiment of the present invention further provides a communications system, where the communications system may include the user equipment and the base station in the foregoing embodiments.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the purposes of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   establishing, by a first base station, a first Packet Data Convergence Protocol (PDCP) entity for a first radio bearer between the first base station and a user equipment;
   sending, by the first base station,
      first configuration information to a second communications node, and
      second configuration information to the user equipment, so as to establish a second radio bearer between the second communications node and the user equipment,
      wherein the first configuration information comprises configuration information of a second PDCP entity of the second communications node,
      the second configuration information comprises configuration information of a fourth PDCP entity of the user equipment,
      the first radio bearer corresponds to the first PDCP entity and a third PDCP entity of the user equipment, and
      the second radio bearer corresponds to the second PDCP entity and the fourth PDCP entity;
   sending, by the first base station,
      fourth configuration information to the second communications node, so as to establish a third bearer between the first base station and the second communications node, and
      information to the second communication node to indicate an association relationship between the second radio bearer and the third bearer,
      wherein the association relationship is used to associate the second radio bearer with the third bearer; and
   using, by the first base station,
      the third bearer and the second radio bearer to transmit at least a part of data of service data between the first base station and the user equipment,
      wherein the first PDCP entity of the first base station and the second PDCP entity of the second communications node perform joint processing on the at least a part of data, and
      the first PDCP entity, of the first base station performs a sequence number processing function on the service data.

2. The method according to claim 1, wherein the configuration information of the second PDCP entity comprises information that instructs the second PDCP entity to perform a buffer function on the at least a part of data.

3. The method according to claim 1, wherein:
   the configuration information of the second PDCP entity further comprises information that instructs the second PDCP entity to perform one part of functions of a header compression processing function, a security processing function, and a PDCP header processing function on the at least a part of data,
   wherein in a process of transmitting the at least a part of data, the first base station further performs, in the first PDCP entity, the other part of functions, except the one part of functions, of the header compression processing function, the security processing function, and the PDCP header processing function on the at least a part of data that undergoes sequence number processing; or
   the configuration information of the second PDCP entity further comprises information that instructs the second PDCP entity to perform a header compression processing function, a security processing function, and a PDCP header processing function on the at least a part of data.

4. The method according to claim 1, wherein in a process of transmitting the at least a part of data, the first base station further performs, in the first PDCP entity, a header compression processing function, a security processing function, and a PDCP header processing function on the at least a part of data.

5. The method according to claim 1, further comprising:
   discarding, by the first PDCP entity, the at least a part of data after transmitting the at least a part of data to the second PDCP entity; or
   starting, by the first PDCP entity, a timer after transmitting the at least a part of data to the second PDCP entity, and discarding the at least a part of data after the timer expires.

6. The method according to claim 1, wherein the service data comprises first data and second data, wherein the second data is the at least a part of data, and the method further comprises:
   sending, by the first base station,
      third configuration information to the user equipment, so as to establish the first radio bearer between the first base station and the user equipment,
      wherein the third configuration information comprises configuration information of the third PDCP entity of the user equipment, and
      the first radio bearer corresponds to the first PDCP entity and the third PDCP entity; and
   using, by the first base station, the first radio bearer to transmit the first data of the service data between the first base station and the user equipment.

7. The method according to claim 6, wherein
   the configuration information of the third PDCP entity comprises information that instructs the third PDCP entity to perform one part of functions of the header compression processing function, the security processing function, and the PDCP header processing function on the second data, and
   the configuration information of the fourth PDCP entity further comprises information that instructs the fourth PDCP entity to perform the other part of functions, except the one part of functions, of the header compression processing function, the security processing function, and the PDCP header processing function on the second data.

8. The method according to claim 1, wherein the service data comprises first data and second data, wherein the second data is the at least a part of data, and the method further comprises:
   establishing, by the first base station, the first radio bearer between the first base station and the user equipment according to the second configuration information, wherein the first radio bearer corresponds to the first PDCP entity and the fourth PDCP entity; and using, by the first base station, the first radio bearer to transmit the first data of the service data between the first base station and the user equipment.

9. A data transmission method, comprising:

receiving, by a user equipment, first configuration information sent by a first base station to establish a first radio bearer, and second configuration information sent by the first base station, the first radio bearer corresponds to a first Packet Data Convergence Protocol (PDCP) entity and a third PDCP entity of the user equipment;

establishing, by the user equipment, a fourth PDCP entity according to the second configuration information, and establishing a second radio bearer between the user equipment and a second communications node,
wherein the second configuration information comprises configuration information of the fourth PDCP entity, and the second radio bearer corresponds to the fourth PDCP entity of the user equipment and a second PDCP entity of the second communications node; and using, by the user equipment, the second radio bearer to transmit at least a part of data of service data between the first base station and the user equipment,
wherein a first PDCP entity of the first base station and the second PDCP entity of the second communications node perform joint processing on the at least a part of data, using a third bearer established between the first base station and the second communication node, according to information indicating an association relationship between the second radio bearer and the third bearer, and
the first PDCP entity performs a sequence number processing function on the service data.

10. The method according to claim 9, wherein the service data comprises first data and second data, wherein the second data is the at least a part of data, and the method further comprises:

receiving, by the user equipment, third configuration information sent by the first base station, to establish the third PDCP entity according to the third configuration information, wherein the third configuration information comprises configuration information of the third PDCP entity; and using, by the user equipment, the first radio bearer to transmit the first data of the service data between the first base station and the user equipment, wherein when transmitting the service data, the user equipment performs, in the third PDCP entity, the sequence number processing function on the service data.

11. The method according to claim 10, wherein the configuration information of the fourth PDCP entity comprises information that instructs the fourth PDCP entity to perform at least a part of functions of a header compression processing function, a security processing function, and a PDCP header processing function on the second data, so that the user equipment performs, in the fourth PDCP entity, processing of one part of functions of the header compression processing function, the security processing function, and the PDCP header processing function on the second data according to the configuration information of the fourth PDCP entity, and performs, in the third PDCP entity, processing of the other part of functions, except the one part of functions, of the header compression processing function, the security processing function, and the PDCP header processing function on the second data according to the configuration information of the third PDCP entity.

12. The method according to claim 9, wherein the service data comprises first data and second data, wherein the second data is the at least a part of data, and the method further comprises:

establishing, by the user equipment, the first radio bearer between the first base station and the user equipment according to the second configuration information, wherein the first radio bearer corresponds to the first PDCP entity and the fourth PDCP entity; and using, by the user equipment, the first radio bearer to transmit the first data of the service data between the first base station and the user equipment, wherein when transmitting the service data, the user equipment performs, in the fourth PDCP entity, the sequence number processing function on the service data.

13. The method according to claim 12, wherein the configuration information of the fourth PDCP entity further comprises information that instructs the fourth PDCP entity to perform a header compression processing function, a security processing function, a PDCP header processing function, and the sequence number processing function on the second data, so that the user equipment performs, in the fourth PDCP entity, the header compression processing function, the security processing function, the PDCP header processing function, and the sequence number processing function on the second data according to the configuration information of the fourth PDCP entity.

14. A base station, comprising:

a receiver;

a processor coupled with the receiver; and a transmitter coupled with the processor, wherein the processor being operable to,
establish a first Packet Data Convergence Protocol (PDCP) entity;

the transmitter being operable to send first configuration information to a second communications node, and send second configuration information to a user equipment, the first configuration information and the second communications node being used to establish a second radio bearer between the second communications node and the user equipment,
wherein the first configuration information comprises configuration information of a second PDCP entity of the second communications node,
the second configuration information comprises configuration information of a fourth PDCP entity of the user equipment, and
the second radio bearer corresponds to the second PDCP entity and the fourth PDCP entity;

send fourth configuration information to the second communications node,
the fourth configuration information being used to establish a third bearer between the first base station and the second communications node;

send an association relationship between the second radio bearer and the third bearer to the second communications node, wherein the association relationship is used to associate the second radio bearer with the third bearer; and control the transmitter to use the third bearer and the second radio bearer to transmit at least a part of data of service data between the first base station and the user equipment,
wherein the first PDCP entity and the second PDCP entity perform joint processing on the at least a part of data, and the processor performs, in the first PDCP entity, a sequence number processing function on the service data.

15. The base station according to claim 14, wherein the configuration information of the second PDCP entity comprises information that instructs the second PDCP entity to perform a buffer function on the at least a part of data.

16. The base station according to claim 14, wherein the configuration information of the second PDCP entity further comprises information that instructs the second PDCP entity to perform one part of functions of a header compression processing function, a security processing function, and a PDCP header processing function on the at least a part of data that undergoes sequence number processing,
  wherein in a process of transmitting the at least a part of data, the processor further performs, in the first PDCP entity, the other part of functions, except the one part of functions, of the header compression processing function, the security processing function, and the PDCP header processing function on the at least a part of data; or
the configuration information of the second PDCP entity further comprises information that instructs the second PDCP entity to perform a header compression processing function, a security processing function, and a PDCP header processing function on the at least a part of data.

17. The base station according to claim 14, wherein in a process of transmitting the at least a part of data, the processor further performs the header compression processing function, the security processing function, and the PDCP header processing function on the at least a part of data.

18. The base station according to claim 14, wherein the processor discards the at least a part of data after transmitting the at least a part of data to the second PDCP entity; or
the processor starts a timer after transmitting the at least a part of data to the second PDCP entity, and discards the at least a part of data after the timer expires.

19. The base station according to claim 14, wherein the service data comprises first data and second data, and the second data is the at least a part of data;
the transmitter further sends third configuration information to the user equipment, so as to establish a first radio bearer between the first base station and the user equipment,
  wherein the third configuration information comprises configuration information of a third PDCP entity of the user equipment, and
the first radio bearer corresponds to the first PDCP entity and the third PDCP entity; and
the processor further control the transmitter to use the first radio bearer to transmit the first data of the service data between the first base station and the user equipment.

20. The base station according to claim 19, wherein the configuration information of the third PDCP entity comprises information that instructs the third PDCP entity to perform one part of functions of the header compression processing function, the security processing function, and the PDCP header processing function on the second data, and
the configuration information of the fourth PDCP entity further comprises information that instructs the fourth PDCP entity to perform the other part of functions, except the one part of functions, of the header compression processing function, the security processing function, and the PDCP header processing function on the second data.

* * * * *